(12) United States Patent
Mizutani et al.

(10) Patent No.: US 7,653,662 B2
(45) Date of Patent: Jan. 26, 2010

(54) METHOD AND SYSTEM FOR DATA PROCESSING WITH DATA DISTRIBUTION MANAGING

(75) Inventors: Hitoshi Mizutani, Yokohama (JP); Atsushi Hirata, Fujisawa (JP); Hiroaki Nakai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 273 days.

(21) Appl. No.: 11/480,972

(22) Filed: Jul. 6, 2006

(65) Prior Publication Data

US 2007/0220215 A1 Sep. 20, 2007

(30) Foreign Application Priority Data

Mar. 17, 2006 (JP) ............................ 2006-074497

(51) Int. Cl.
*G06F 17/30* (2006.01)

(52) U.S. Cl. ...................... 707/200; 707/201; 707/203

(58) Field of Classification Search ................ 711/154; 707/204, 10, 200, 201, 203

See application file for complete search history.

(56) References Cited

U.S. PATENT DOCUMENTS

| | | | | |
|---|---|---|---|---|
| 5,355,445 A * | 10/1994 | Shibao et al. | ................. | 706/50 |
| 5,455,932 A * | 10/1995 | Major et al. | ................. | 711/162 |
| 5,513,341 A * | 4/1996 | Fujii et al. | ..................... | 714/43 |
| 5,537,533 A * | 7/1996 | Staheli et al. | ................. | 714/5 |
| 5,633,999 A * | 5/1997 | Clowes et al. | ................. | 714/6 |
| 5,742,829 A * | 4/1998 | Davis et al. | ................. | 717/178 |
| 5,787,414 A * | 7/1998 | Miike et al. | ..................... | 707/2 |
| 5,852,724 A * | 12/1998 | Glenn et al. | ................ | 709/239 |
| 6,212,521 B1 * | 4/2001 | Minami et al. | ................ | 707/10 |
| 6,725,446 B1 * | 4/2004 | Hahn et al. | ................ | 717/103 |
| 7,243,156 B2 * | 7/2007 | Hahn et al. | ................ | 709/231 |
| 7,383,264 B2 * | 6/2008 | Sutoh et al. | ................... | 707/10 |
| 2004/0177156 A1 * | 9/2004 | Hahn et al. | ................ | 709/240 |
| 2004/0205473 A1 * | 10/2004 | Fisher et al. | ................ | 715/500 |
| 2007/0016663 A1 * | 1/2007 | Weis | ......................... | 709/223 |

FOREIGN PATENT DOCUMENTS

JP 2001-331354 11/2001

* cited by examiner

*Primary Examiner*—Jean M Corrielus
(74) *Attorney, Agent, or Firm*—Brundidge & Stanger P.C.

(57) ABSTRACT

It is judged whether the reference data is the latest and if not the latest, the data is updated to the latest in a short time. A program in which data creation procedure is pre-defined creates requested secondary data according to primary data. The primary data, the secondary data, and data update information including the primary data update time and the secondary data update time are stored in a storage device. When the relationship between data update information on the primary data and the secondary data used for creating the requested secondary data when generation of the secondary data is requested and the data update information on the requested secondary data does not satisfy a predetermined condition, a program for creating the requested secondary data is executed. Furthermore, the primary data and the secondary data are outputted to the output unit while correlating them to each other.

21 Claims, 23 Drawing Sheets

| PROCESS NAME | OUTPUT DESTINATION | INPUT SOURCE |
|---|---|---|
| | | |

176

| PROCESS NAME | OUTPUT DESTINATION | INPUT SOURCE |
|---|---|---|
| P1 | Table-A.01 | Table-B.01, Table-B.02 |
| P2 | Table-B.01 | Table-C.01 |
| P3 | Table-B.01 | Table-D.01, Table-E.01 |

| PROCESS NAME | START TIME | END TIME | NORMAL START TIME | PROCESSING TIME |
|---|---|---|---|---|
| | | | | |

| PROCESS NAME | START TIME | END TIME | NORMAL START TIME | PROCESSING TIME |
|---|---|---|---|---|
| P1 | | | 03:00 / DAY | |

FIG. 3C

| PROCESS NAME | START TIME | END TIME | NORMAL START TIME | PROCESSING TIME |
|---|---|---|---|---|
| P1 | 2005/1/3 03:00 | | 03:00 / DAY | |

FIG. 3D

| PROCESS NAME | START TIME | END TIME | NORMAL START TIME | PROCESSING TIME |
|---|---|---|---|---|
| P1 | 2005/1/3 03:00 | 2005/1/3 05:00 | 03:00 / DAY | 02:00 |

FIG. 4A

| TABLE NAME (401) | UPDATE TIME (402) |
|---|---|
|  |  |

| TABLE NAME | UPDATE TIME |
|---|---|
| Table-A | 2005/1/3 3:00 |
| Table-B | 2005/1/3 2:00 |

FIG. 4C

| TABLE NAME | UPDATE TIME |
|---|---|
| Table-A | 2005/1/3 5:00 |
| Table-B | 2005/1/3 2:00 |

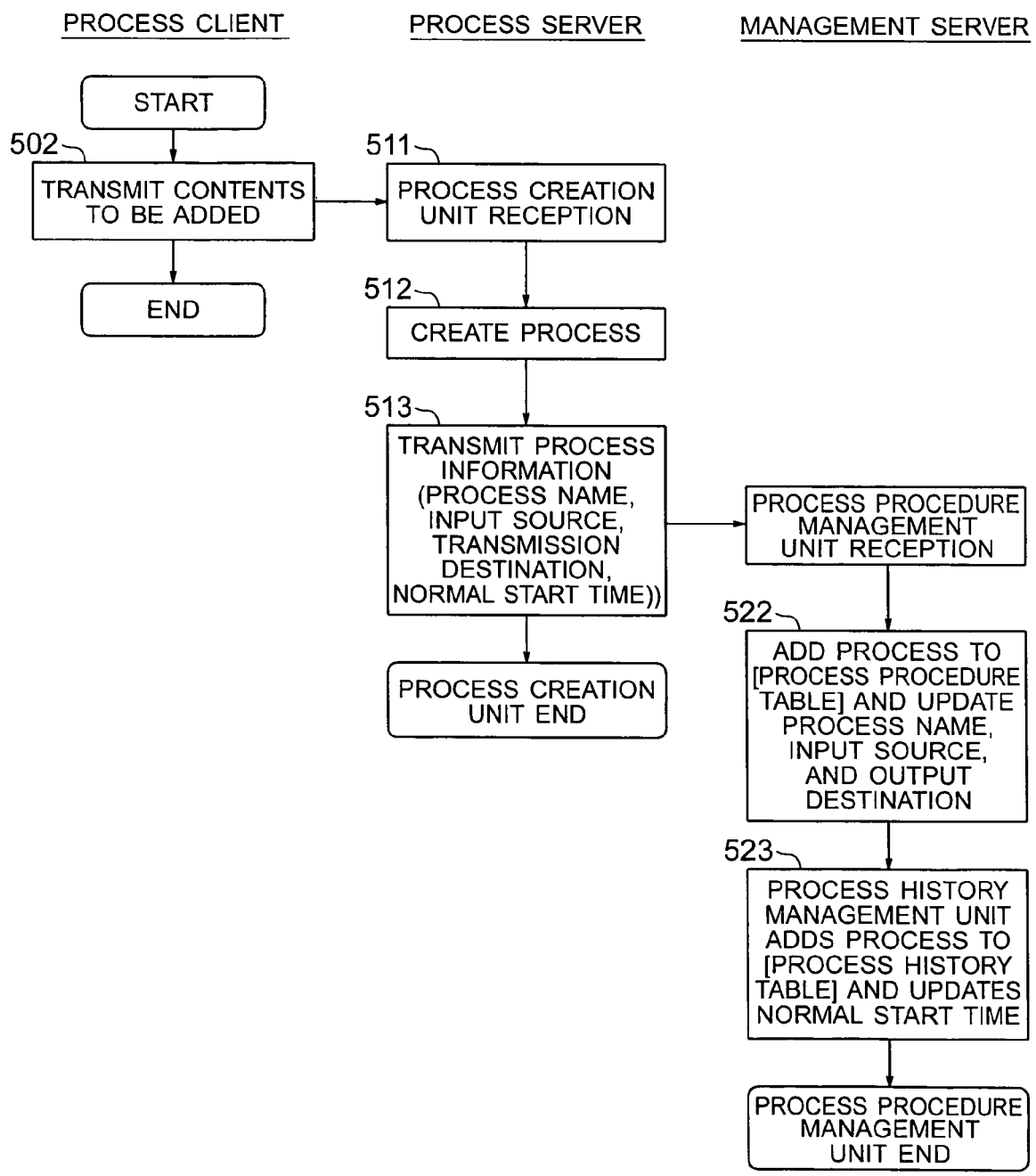

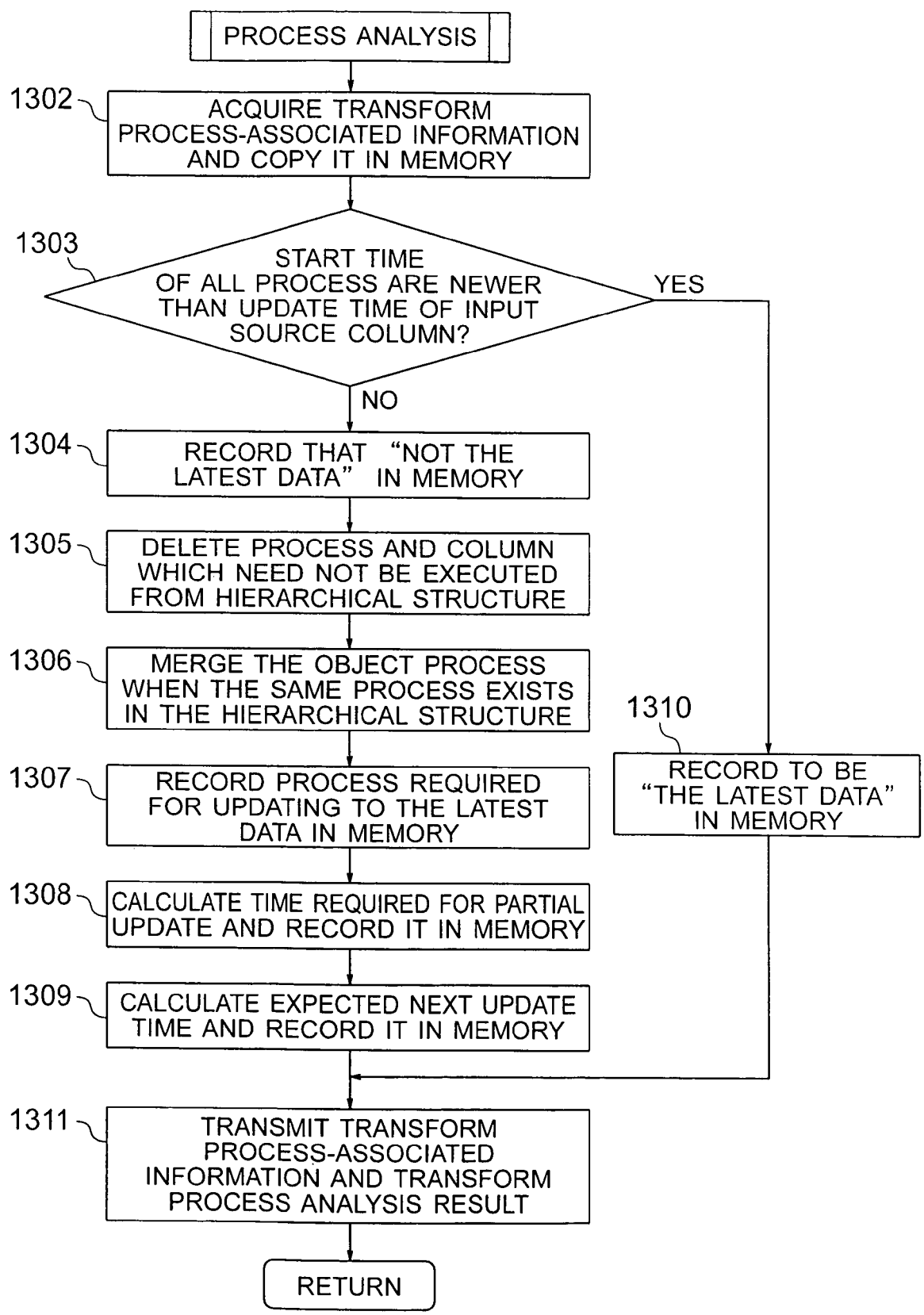

FIG. 15B

| ITEM | ANALYSIS RESULT |
|---|---|
| 1411 UPDATE STATE: | NOT THE LATEST DATA |
| 1412 PROCESS FOR THE LATEST | P3, P1 |
| 1413 TIME REQUIRED FOR PARTIAL UPDATE | 02:30 |
| 1414 NEXT UPDATE PLAN | 2005/1/4 05:00 |

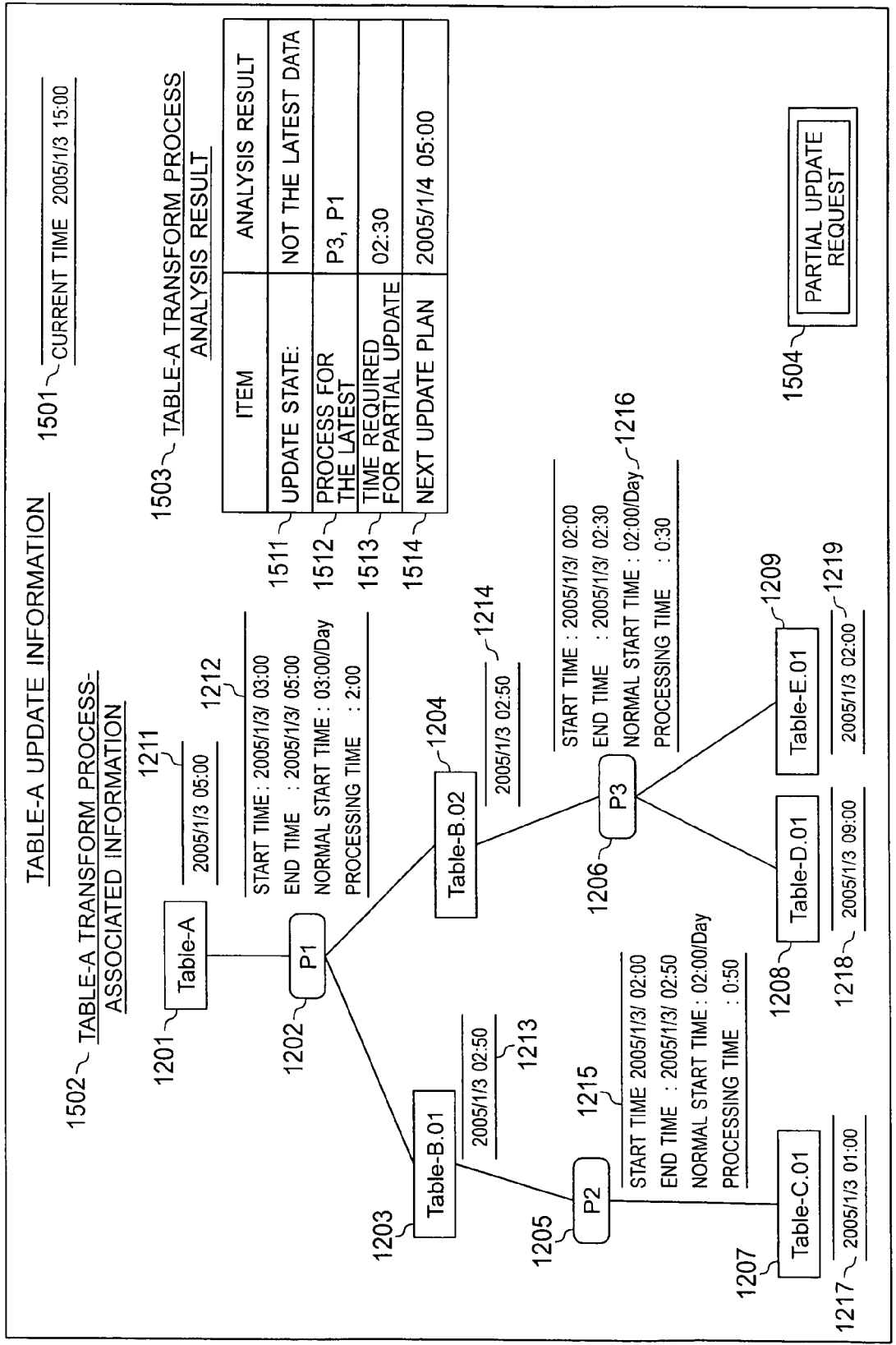

METHOD AND SYSTEM FOR DATA PROCESSING WITH DATA DISTRIBUTION MANAGING

INCORPORATION BY REFERENCE

The present application claims priority from Japanese application JP2006-074497 filed on Mar. 17, 2006, the content of which is hereby incorporated by reference into this application.

BACKGROUND OF THE INVENTION

The present invention relates to a data processing technique for processing primary data such as input information so as to generate secondary data.

In an inventory control system in a franchise chain or the like, information such as the number of articles sold is inputted from a terminal at each store. The primary data such as the sales number inputted is collected to a data center or the like and totaled. The collected primary data is converted into secondary data which can easily be used by a user for article inventory control.

When each store is connected to the data center online and the primary data is transmitted in real time, there is a danger to increase the network traffic. Moreover, there is a case that realization of online itself is desirable.

To cope with this, such a method can be considered that the primary data is temporarily accumulated and batch processing is performed periodically to generate secondary data. However, such a batch processing has a problem that there is a time difference between the timing of input of the primary data and the timing of generation of the secondary data. It is preferable to prevent generation of a difference between the stock amount registered by the system and the actual stock amount which may cause lack of articles or an excessive stock.

In order to solve these problems, there is considered a method for generating data in accordance with necessity when referencing the secondary data. However, when it is necessary to use an enormous amount of primary data for generating secondary data, the processing requires a plenty of time. Moreover, even when only a part of the primary data is updated, all the programs necessary for generation of the secondary data should be executed.

For this, JP-A-2001-331354 discloses a technique for deriving a relationship between the primary data, the secondary data, and a program required for generation of the secondary data.

SUMMARY OF THE INVENTION

However, the conventional technique only acquires a range where the primary data is acquired. Thus, the secondary data referenced is desired to be the latest. It should be noted that, when the secondary data is the latest, the primary data required for generation of the secondary data has not been updated since the last secondary data was generated.

It is therefore an object of the present invention to judge whether the secondary data referenced is the latest and extract and execute a program required for updating to the latest state.

A representative embodiment of the present invention is characterized by a data processing method for creating requested secondary data by a program in which a data creation procedure is pre-defined according to primary data in a data processing system comprising a processor, a memory accessible from the processor, a storage device, an input unit, and an output unit, wherein the processor executes the program, the memory stores the program, the storage device stores the primary data, the secondary data, and data update information including update time of the primary data, and update time of the secondary data, and the processor executes a program for creating the requested secondary data if the relationship between the data update information on the primary data and the secondary data used for creating the requested secondary data and the data update information on the requested secondary data does not satisfy a predetermined condition when generation of the secondary data is requested.

According to the representative embodiment of the present invention, for creating secondary data, only a necessary program should be executed. Accordingly, it is possible to update the secondary data to the latest state in a short time.

In order to create secondary data to be analyzed, intermediate secondary data may be created from primary data. Namely, the secondary data may be created based on the intermediate secondary data. In such a case, the secondary data to be analyzed is called "secondary data", and the other data are called "primary data".

Other objects, features and advantages of the invention will become apparent from the following description of the embodiments of the invention taken in conjunction with the accompanying drawings.

BRIEF DESCRIPTION OF THE DRAWINGS

FIG. 3A shows an initial state of a process history table according to an embodiment.

FIG. 3B shows a state of process edition end of the process history table according to an embodiment.

FIG. 3C shows a state of a process execution start of the process history table according to an embodiment.

FIG. 3D shows a state of a process execution end of the process history table according to an embodiment.

FIG. 4A shows an initial state of a table management table according to an embodiment.

FIG. 4B shows a state of the table management table to which a table is added according to an embodiment.

FIG. 4C shows a state of the table management table when the table updated according to an embodiment.

FIG. 5 is a flowchart of process edition according to an embodiment.

FIG. 14 is a flowchart of a process analysis processing according to an embodiment.

FIG. 15B shows an analysis result of the process analysis processing according to an embodiment.

FIG. 16 shows an update information view according to an embodiment.

DESCRIPTION OF THE EMBODIMENTS

Description will now be directed to the embodiments of the present invention.

Figure 1A:
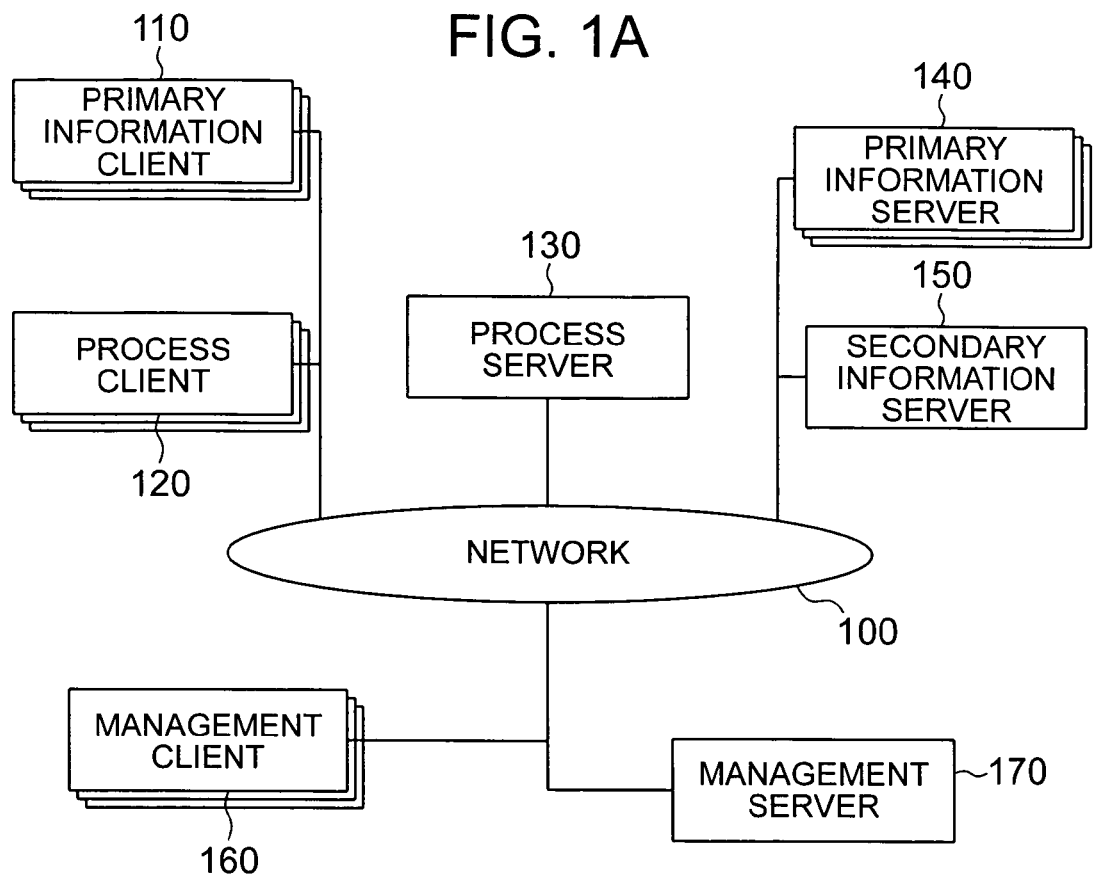
FIG. 1A shows a system configuration of an embodiment of the present invention.

FIG. 1A is a configuration diagram showing a data processing system according to the present embodiment.

The data processing system includes a primary information client 110, a process client 120, a process server 130, a primary information server 140, a secondary information server 150, a management client 160, and a management server 170. The primary information client 110, the process client 120, the process server 130, the primary information server 140, the secondary information server 150, the management client 160, and the management server 170 are connected to one another by a network 100.

As will be detailed with reference to FIG. 1B, the primary information client 110 receives data inputted by a user and transmits it to the primary information server 140.

The primary information server 140 receives data inputted by the primary information client 110. The primary information server 140 stores the received data as will be detailed with reference to FIG. 1C.

The process client 120 receives an input of a data processing procedure as will be detailed with reference to FIG. 1D. The inputted processing procedure is transmitted to the process server via the network 100.

The process server 130 receives the processing procedure transmitted by the process client 120. The process server 130 processes the received processing procedure and creates a process of a format which can be executed as will be detailed with reference to FIG. 1E. The process server 130 transmits the information associated with the process created.

A process means a series of the following treatments: extracting primary data, processing or transforming the primary data according to a predefined procedure to create secondary data, and storing or loading the generated secondary data. For example, suppose that the primary data is an article sales number/quantity, sales price, and initial cost and the secondary data is a profit. Here, the process multiplies the difference between the sales price and the initial cost by the sales number/quantity. Moreover, the process may be a program executing the treatment starting from extraction of the primary data and ending by generation and storage or load of secondary data.

The secondary information server 150 receives the secondary data generated by the process. The secondary information server 150 stores the received secondary data as will be detailed with reference to FIG. 1F.

The management client 160 instructs the management server 170 to execute data analysis as will be detailed with reference to FIG. 1G. Moreover, the management client 160 receives the analysis result from the management server 170 via the network 100. The management client 160 displays the received analysis result.

The management server 170 receives the instruction from the management client 160 and executes data analysis as will be detailed with reference to FIG. 1H. In the data analysis, primary data and a process required for generation of the secondary data to be referenced by a user is extracted and it is judged that the secondary data referenced is the latest according to the primary data update time and the process execution history. If the secondary data referenced is not the latest, the management server 170 extracts a process required for updating the data. Furthermore, the management server 170 calculates an estimation time required for updating the data. The management server 170 transmits the analysis result to the management client 160 via the network 100.

Figure 1B:
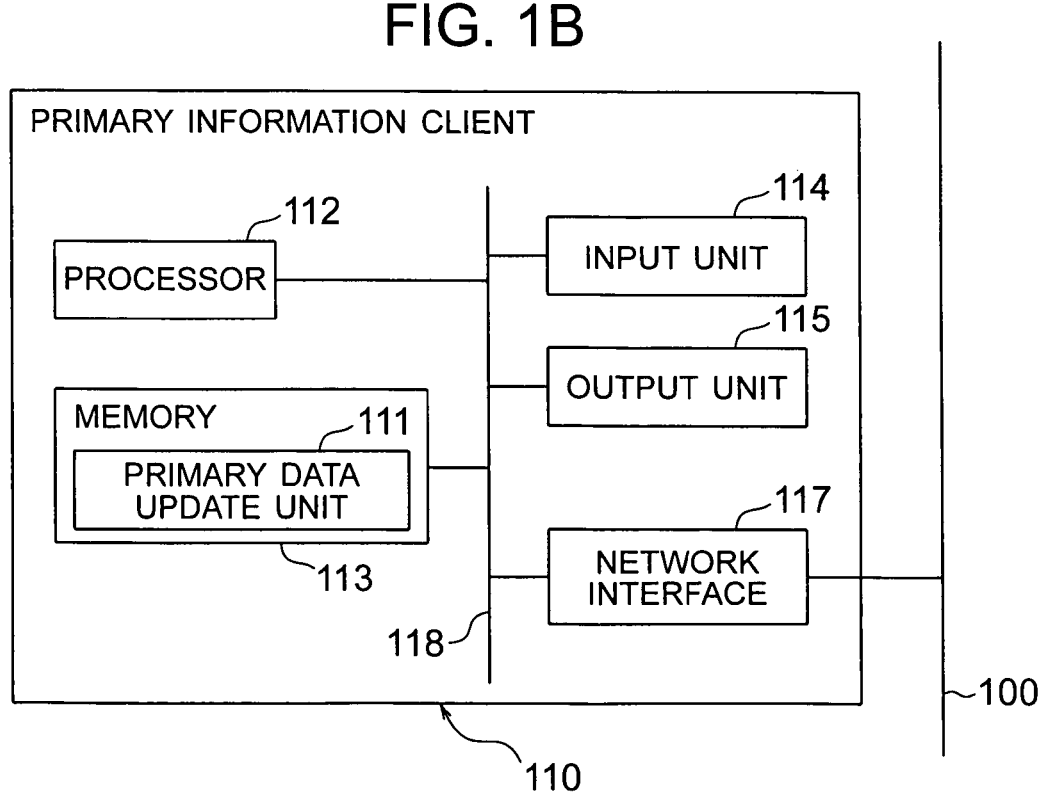
FIG. 1B shows a system configuration of a primary information client according to an embodiment.

FIG. 1B is configuration diagram showing the primary information client 110 according to the present embodiment.

The primary information client 110 includes a processor 112, a memory 113, an input unit 114, an output unit 115, and a network interface 117. The processor, the memory 113, the input unit 114, the output unit 115, and the network interface 117 are connected to one another via an internal bus 118.

The input unit 114 may be, for example, a keyboard and a mouse, and primary information is inputted via them. The output unit 115 may be, for example, a display and information such as input view and input result is outputted via it.

The processor 112 performs various processes by executing the program stored in the memory 113.

The memory 113 stores a program executed by the processor 112 and information required for the processor 112. The memory 113 stores a primary data update unit 111. The primary data update unit 111 transmits the data inputted from the input unit to the primary information server 140.

The network interface 117 is connected to the network 100.

Figure 1C:
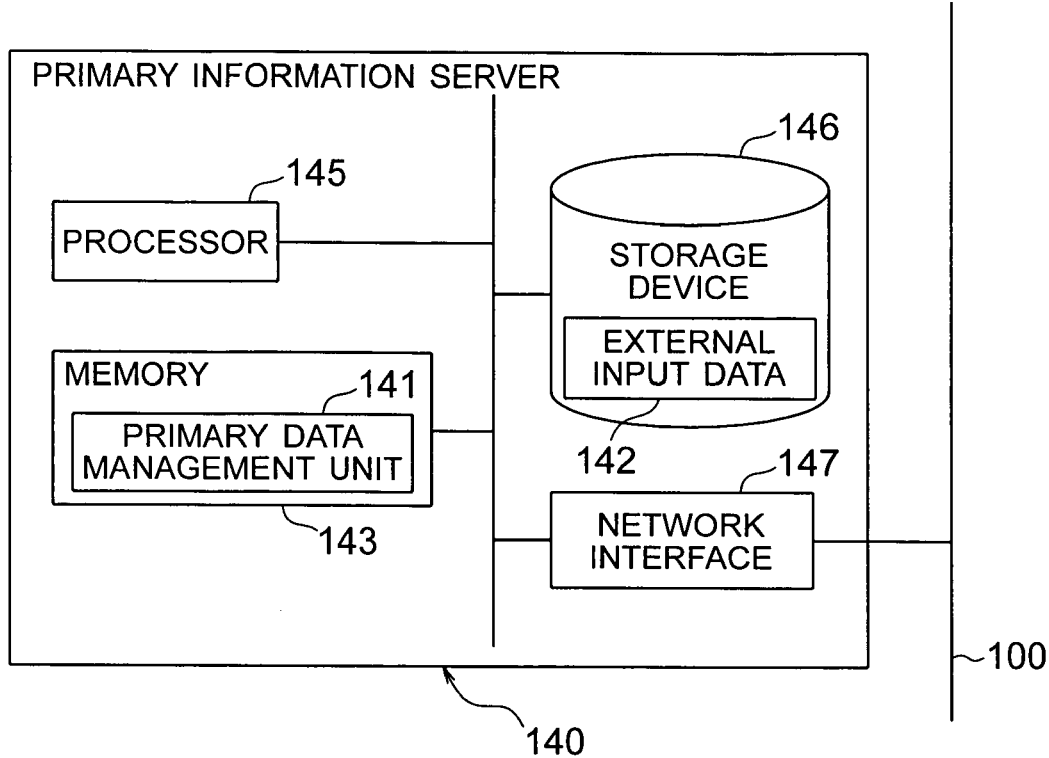
FIG. 1C shows a system configuration of a primary information server according to an embodiment.

FIG. 1C is a configuration diagram showing the primary information server 140 according to the present embodiment.

The primary information server 140 includes a memory 143, a processor 145, a storage device 146, and a network interface 147. The memory 143, the processor 145, the storage device 146, and the network interface 147 are connected to one another via an internal bus 148.

The processor 145 executes various processes by executing a program stored in the memory 143.

The storage device 146 includes a magnetic disc drive. The storage device 146 may constitute RAID by a plurality of disk drives. The storage device 146 stores external input data 142.

The external input data 142 is input information from the primary information client 110.

The memory 143 stores a program executed by the processor 145 and information required for the processor 145. The memory 143 stores a primary data management unit 141.

The primary data management unit 141 receives input data transmitted from the primary information client 110 and updates the external input data 142. Moreover, the primary data management unit 141 transmits the time of updating the external input data 142 together with a table name added or updated, to the management server 170.

The network interface 147 is connected to the network 100.

Figure 1D:
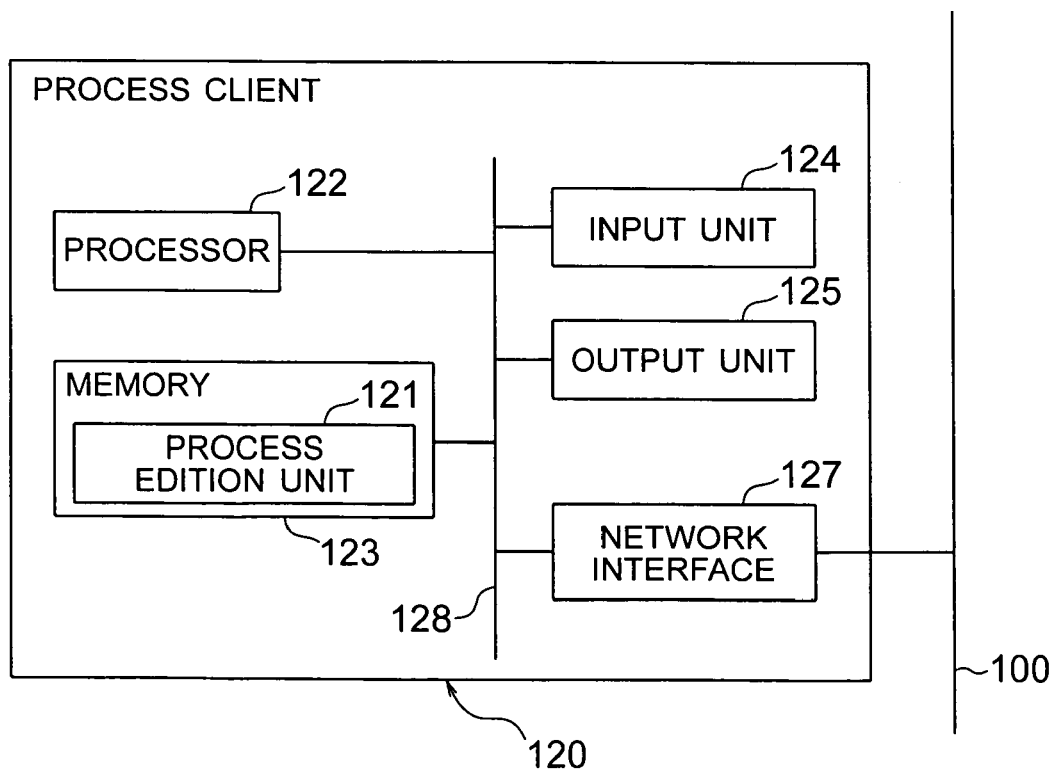
FIG. 1D shows a system configuration of a process client according to an embodiment.

FIG. 1D is a configuration diagram showing the process client 120 according to the present embodiment.

The process client 120 includes a processor 122, a memory 123, an input unit 124, an output unit 125, and a network interface 127. The processor, the memory 123, the input unit 124, the output unit 125, and the network interface 127 are connected to one another via an internal bus 128.

The input unit 124 is, for example, a keyboard or a mouse and the contents of the process are inputted through them. The output unit is, for example, a display for outputting information such as an input view and an input result.

The processor 122 executes various processes by executing a program stored in the memory 123.

The memory 123 stores a program executed by the processor 122 and information required for the processor 122. The memory 123 stores a process edition unit 121. The process edition unit 121 transmits the contents of the process inputted from the input unit 124 to the process server 130.

The network interface 127 is connected to the network 100.

Figure 1E:
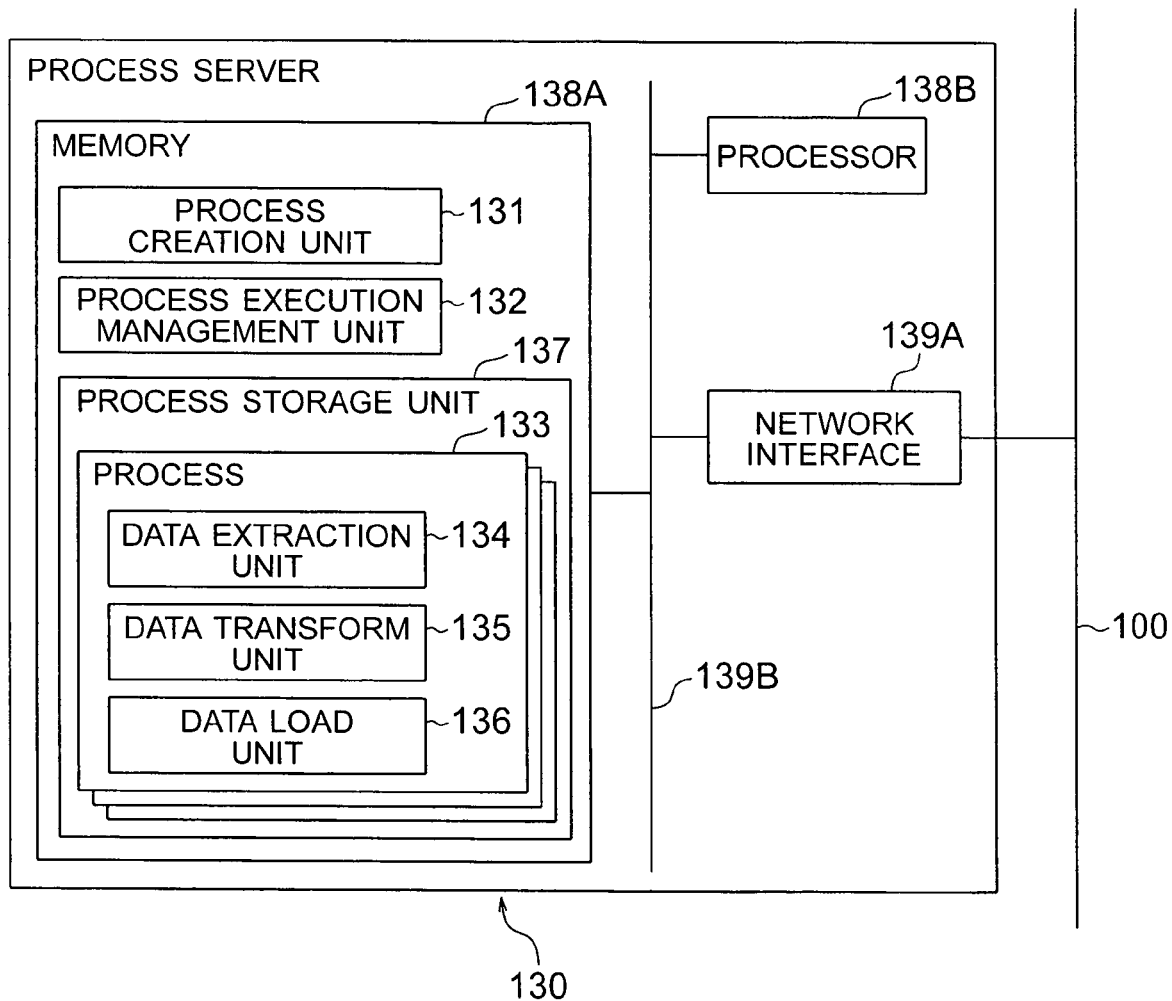
FIG. 1E shows a system configuration of a process server according to an embodiment.

FIG. 1E is a configuration diagram showing the process server 130 according to the present embodiment.

The process server 130 includes a memory 138A, a processor 138B, and a network interface 139A. The memory 138A, the processor 138B, and the network interface 139A are connected to one another via an internal bus 139B.

The processor 138B executes various processes by executing a program stored in the memory 138A.

The memory 138A stores a program executed by the processor 138B and information required for the processor 138B. The memory 138A stores a process creation unit 131, a process execution management unit 132 and a process storage unit 137.

The process creation unit 131 creates a process 133 from information such as contents of the process transmitted from the process client 120. The process creation unit 131 stores the created process 133 in the process storage unit 137 and transmits predetermined information to the management server 170.

The process execution management unit 132 receives the process execution instruction and controls execution of the specified process. Moreover, when a predetermined process is periodically executed such as a daily process, the process execution management unit 132 controls execution of the process.

The process storage unit 137 stores a plurality of processes 133. The process 133 is created by the process creation unit 131 according to the process contents received from the process client. The process 133 includes a data extraction unit 134, a data transform unit 135, and a data load unit 136.

The data extraction unit 134 extracts data required for execution of the process 133 from the external input data 142 in the primary information server 140 or the process transform data 152 in the secondary information server 150.

The data transform unit 135 processes data according to a procedure defined in the process 133.

The data load unit 136 stores the secondary data processed by the data transform unit 135 in the process transform data 152 in the secondary information server 150.

The network interface 139A is connected to the network 100.

Figure 1F:
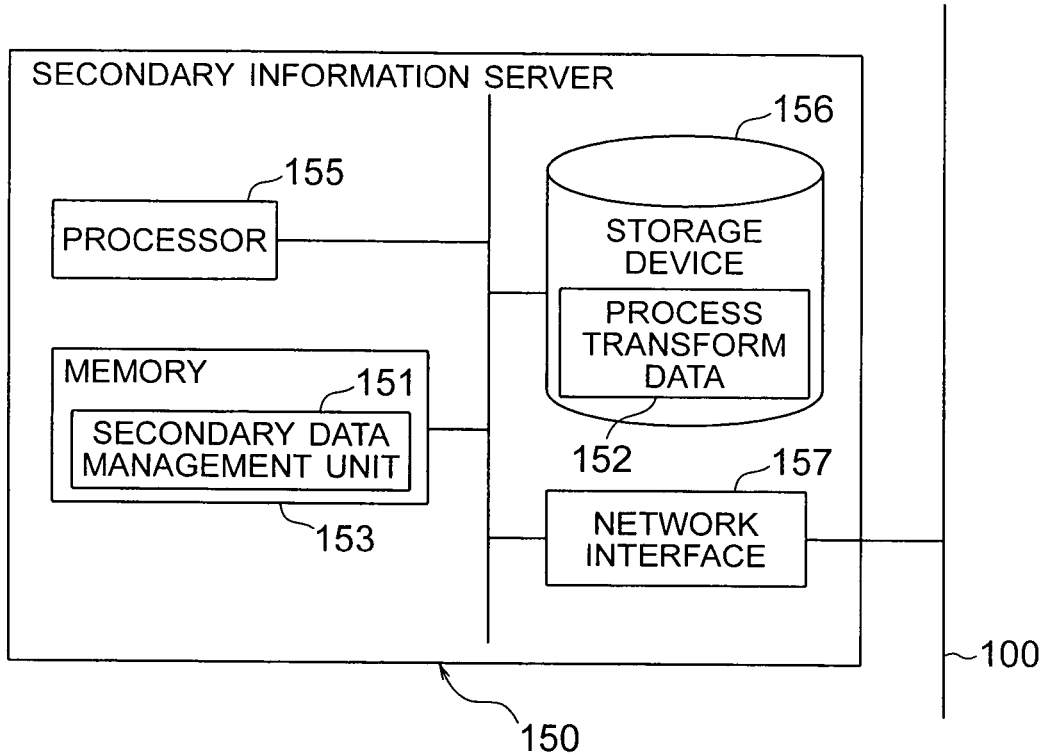
FIG. 1F shows a system configuration of a secondary information server according to an embodiment.

FIG. 1F is a configuration diagram showing the secondary information server according to the present embodiment.

The secondary information server 150 includes a memory 153, a processor 155, a storage device 156, and a network interface 157. The memory 153, the processor 155, the storage device 156, and the network interface 157 are connected to one another via an internal bus 158.

The processor 155 executes various processes by executing a program stored in thee memory 153.

The memory 153 stores a program executed by the processor 155 and information required for the processor 155. The memory 153 stores a secondary data management unit 151. The secondary data management unit 151 receives the secondary data generated by the process server 130 and stores it in the storage device 156. Moreover, the secondary data management unit 151 transmits the time of reception of the secondary data together with the updated table name to the management server 170.

The storage device 156 includes a magnetic disk drive. The storage device 156 may constitute RAID by a plurality of disk drives. The storage device 156 stores process transform data 152. The process transform data 152 is secondary data generated by the process server 130 as has been described above. It should be noted that the process transform data 152 may be regenerated by the external input data 142 stored in the primary information server 140 and the process 133 stored in the process storage unit 137 of the process server 130.

The network interface 157 is connected to the network 100.

Figure 1G:
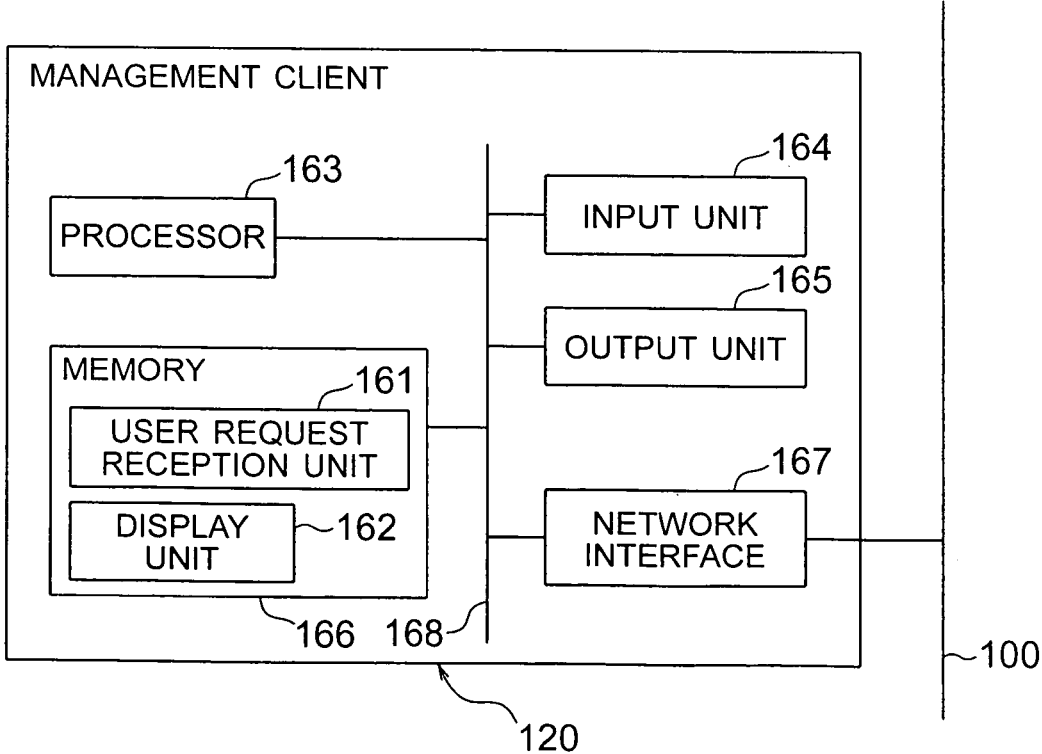
FIG. 1G shows a system configuration of a management client according to an embodiment.

FIG. 1G is a configuration diagram showing the management client 160 according to the present embodiment.

The management client 160 includes a processor 163, a memory 166, an input unit 164, an output unit 165, and a network interface 167. The processor 163, the memory 166, the input unit 164, the output unit 165, and the network interface 167 are connected to one another via an internal bus 168.

The input unit 164 may be, for example, a keyboard or a mouse and information required for specification of a table to be referenced is inputted via them. The output unit 165 may be, for example, a display for outputting an input view and secondary data or the like acquired.

The processor 163 executes various processes by executing a program stored in the memory 166.

The memory 166 stores a program executed by the processor 163 and information required for the processor 163. The memory 166 stores a user request reception unit 161 and a display unit 162.

The user request reception unit 161 receives specification of a table to be referenced by a user. The user request reception unit 161 acquires the contents of the specified table from the primary information server 140 or the secondary information server 150. Furthermore, when the user request reception unit 161 receives a request for display of the update information from a user, it transmits a table name specified in the management server 170 and requests data analysis and generation of update information. The display unit 162 displays the secondary data and update information specified by the user request reception unit 161.

The network interface 167 is connected to the network 100.

Figure 1H:
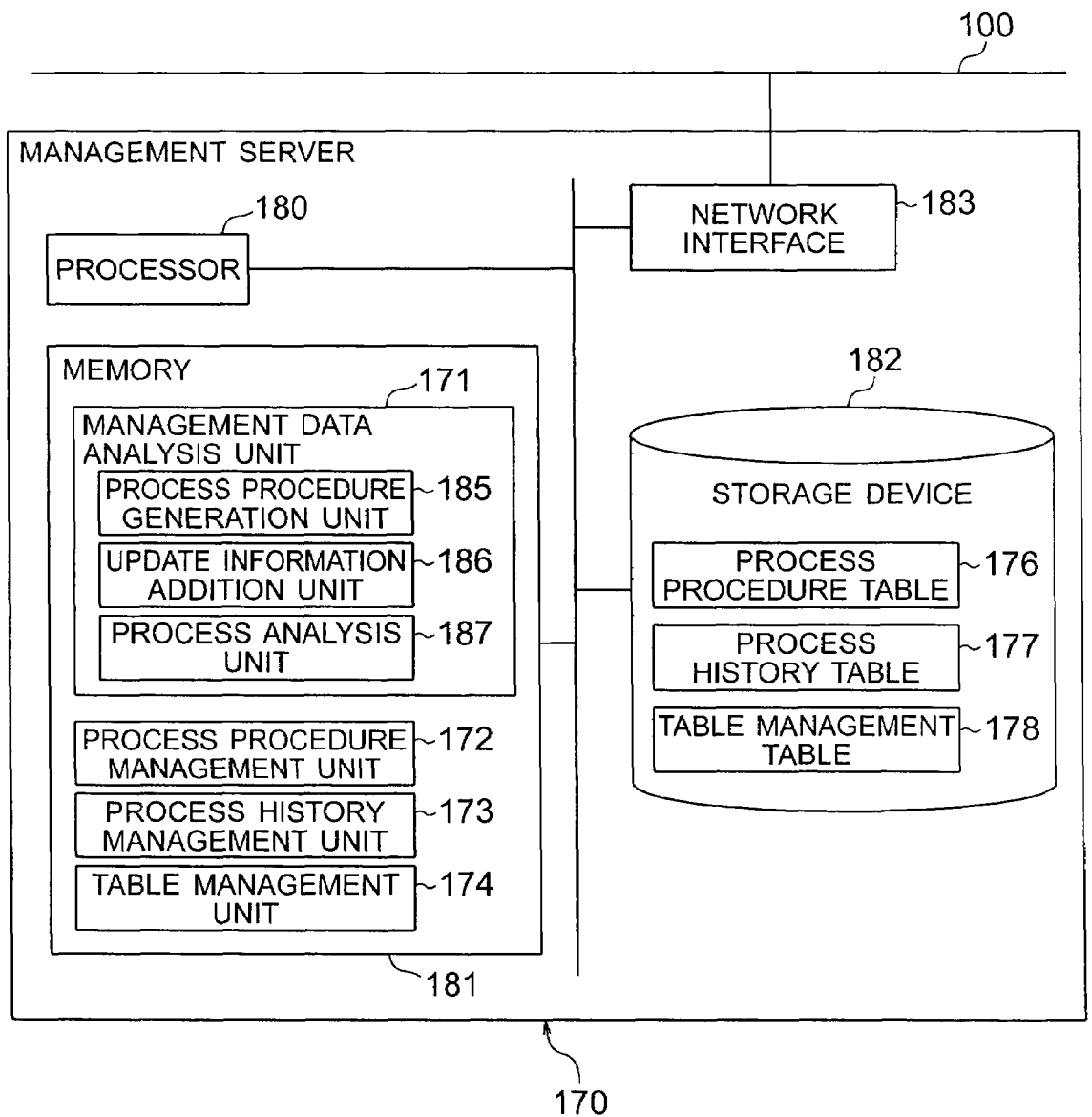
FIG. 1H shows a system configuration of a management server according to an embodiment.

FIG. 1H is a configuration diagram showing the management server according to the present embodiment.

The management server 170 includes a processor 180, a memory 181, a storage device 182, and a network interface 183. The processor 180, the memory 181, the storage device 182, and the network interface 183 are connected to one another via an internal bus 184.

The processor 180 executes various processes by executing a program stored in the memory 181.

The memory 181 stores a program executed by the processor and information required for the processor 180. The memory 181 stores a process procedure management unit 172, a process history management unit 173, and a table management unit 174.

The storage device 182 stores a process procedure table 176, a process history table 177, and a table management table 178.

The management data analysis unit 171 receives an analysis instruction from the management client and analyzes the data. The management data analysis unit 171 includes a process procedure generation unit 185, an update information addition unit 186, and a process analysis unit 187.

The process procedure generation unit 185 and the update information addition unit 186 generate update information specified by referencing the process execution history.

The process analysis unit 187 extracts a process required for updating the table specified by using the acquired update information to the latest state and calculates time required for estimation. It should be noted that the latest state of the table means that the secondary data stored in the table is the latest.

The process procedure management unit 172 receives process information transmitted from the process server 130. The process procedure management unit 172 stores the received process information in the process procedure table 176. The process procedure means correspondence between the primary data inputted to the process and the secondary data outputted from the process. Details of the process procedure table 176 will be given with reference to FIG. 2.

The process history management unit 173 stores the process history executed immediately before in the process history table 177. The process history is information including the process start time and end time. It should be noted that the process history information may be considered as data update information on the first data inputted to the process and the secondary data outputted from the process. Details of the process history table 177 will be given with reference to FIG. 3A.

When the external input data is registered or updated, the table management unit 174 receives a report from the primary information server 140 and records the update time in the table management table 178. For the process transform data 152 also, report is received from the secondary information server 150 and the update time is recorded in the table management table 178. The update times recorded are contained in the data update information of the primary data and the secondary data. Details of the table management table 178 will be given with reference to FIG. 4.

The network interface 183 is connected to the network 100.

Next, explanation will be given on a table storing data required for the present embodiment.

Figures 2A, 2B:
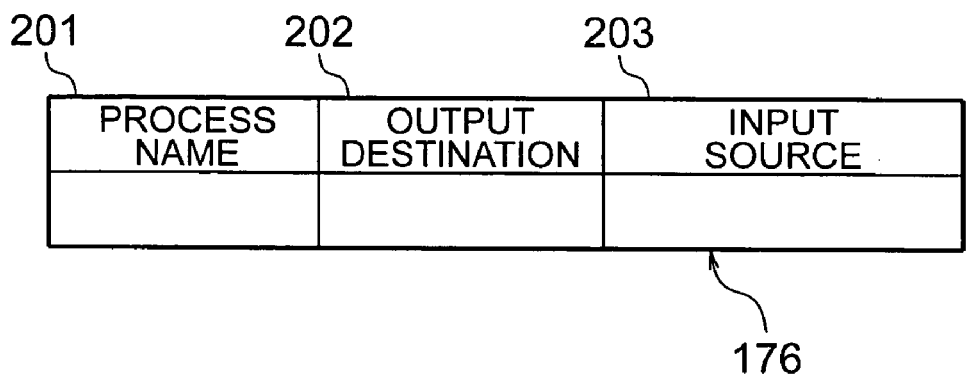
FIG. 2A shows an initial state of a process procedure table according to an embodiment.
FIG. 2B shows a state of the process procedure table when data is added to the initial state according to an embodiment.

FIG. 2A shows an initial state of the process procedure table 176. FIG. 2B shows the initial state of the process procedure table 176 to which data is added.

The process procedure table 176 holds the relationship between the primary data inputted to the process and the secondary data outputted from the process. The process procedure table 176 includes a process name 201, an output destination 202, and an input source 203.

The process name 201 stores a name of the process. The process name 201 uniquely identifies each process.

The output destination 202 stores a table and a column holding the secondary data outputted from the process. The output destination 202 uniquely identifies a record in the process procedure table 176 by the combination with the process name 201.

The input source 203 stores a table and a column holding the primary data inputted to the process.

In FIG. 2B, a record 204 is added. The record 204 indicates that, when the contents of column "01" and "02" of "Table-B" are inputted to the process "P1", the processing result is outputted to the column "01" of "Table-A".

FIG. 3A shows an initial state of the process history table 177. FIG. 3B shows a state of the process edition end. FIG. 3C shows a state of the process start. FIG. 3D shows a state of the process end.

As has been described above, the process history table 177 contains a history of a process which has been executed immediately before. As shown in FIG. 3A, the process history table 177 contains a process name 301, a start time 302, an end time 303, a normal start time 304, and a processing time 305.

The process name 301 stores a name of the process. The process name 301 uniquely identifies each process.

The start time 302 stores a start time of the last process executed.

The end time 303 stores an end time of the last process executed.

The normal start time 304 stores a pre-specified execution start date and time when processes are periodically executed such as in a batch mode.

The processing time 305 stores the time required for processing the last process executed.

As shown in FIG. 3B, when a new process is added or a process is updated by a process client 120, only the process name and the normal start time 304 are registered.

As shown in FIG. 3C, when a process is started, the start time 302 is updated by the process history management unit 173 of the management server 170.

As shown in FIG. 3D, when a process is terminated, the end time 303 is updated by the process history management unit 173 of the management server 170. Furthermore, the process history management unit 173 calculates the processing time from the start time and the end time and updates the processing time 305.

When data is already stored in the process history table 177, the start time 302 and the end time 303 are directly overwritten. Accordingly, if the time stored in the start time 302 is later than the time stored in the end time 303, this means that a process is being executed.

FIG. 4A shows an initial state of the table management table 178. FIG. 4B shows a state when a table is added. FIG. 4C shows a state of when the table is updated.

The table management table 178 stores the table update time. As shown in FIG. 4A, the table management table 178 contains a table name 401 and an update time 402.

The table name 401 is a table name of a table storing external input data 142 or process transform data 152. The table name 401 uniquely identifies each table.

The update time 402 stores the time when the table specified by the table name 401 is updated for the last time.

When a table is added to the primary information server 140 or the secondary information server 150, a record 403 is added to the table management table 178 of the initial state shown in FIG. 4A. Furthermore, when "Table-A" is updated, the update time is overwritten in the update time 402 as shown in FIG. 4C.

Next, explanation will be given on the method for storing data in the process procedure table 176, the process history table 177, and the table management table 178 with reference to the flowcharts of FIG. 5 to FIG. 7.

FIG. 5 is a flowchart of the process edition processing. The process edition includes a process addition, deletion, and correction. FIG. 5 shows a process addition.

A process addition is performed by storing the processing contents of the process inputted from the process client 120 in the process server. Furthermore, the process-associated information is stored in the process procedure table 176 and the process history table 177.

A process designer activates the process edition unit 121 at the process client 120. The process designer inputs information required for adding a process from the input unit 124 of the process client 120. When the input of the information is complete, the process edition unit 121 transmits the edition contents of the process to be added, to the process server 130 (step 502). When the transmission of the process to be added is complete, the process edition unit 121 terminates the processing.

The process server 130 receives the processing contents of the process to be added, from the process client 120 (step 511). The process creation unit 131 creates a process based on the processing contents of the process received (step 512). The process created is stored as a process 133 in the process storage unit 137 of the process server 130.

Furthermore, the process creation unit 131 transmits information on the created process to the management server 170. The process creation unit 131 transmits the process name, the output destination column, the input source column, and the process normal start time (step 513). When the transmission of the information on the created process is complete, the process creation unit 131 terminates the processing.

The management server 170 receives the information on the aforementioned process (step 521). The process procedure management unit 172 creates a new record according to the received information and adds it to the process procedure table 176 (step 522). More specifically, the process procedure management unit 172 creates a new record from the process name 201, the output destination 202, and the input source 203 which have been received and adds the new record to the process procedure table 176. FIG. 2B shows an example of a state of the process procedure table to which a record has been added.

Next, the process history management unit 173 adds the new record to the process history table 177 according to the received information (step 523). More specifically, the process history management unit 173 creates a new record from the received process name and the normal start time and adds the new record to the process history table 177. FIG. 3B shows an example of a state of the process history table 177 to which the record has been added.

Moreover, the process deletion and correction are executed by the similar procedure.

Figure 6:
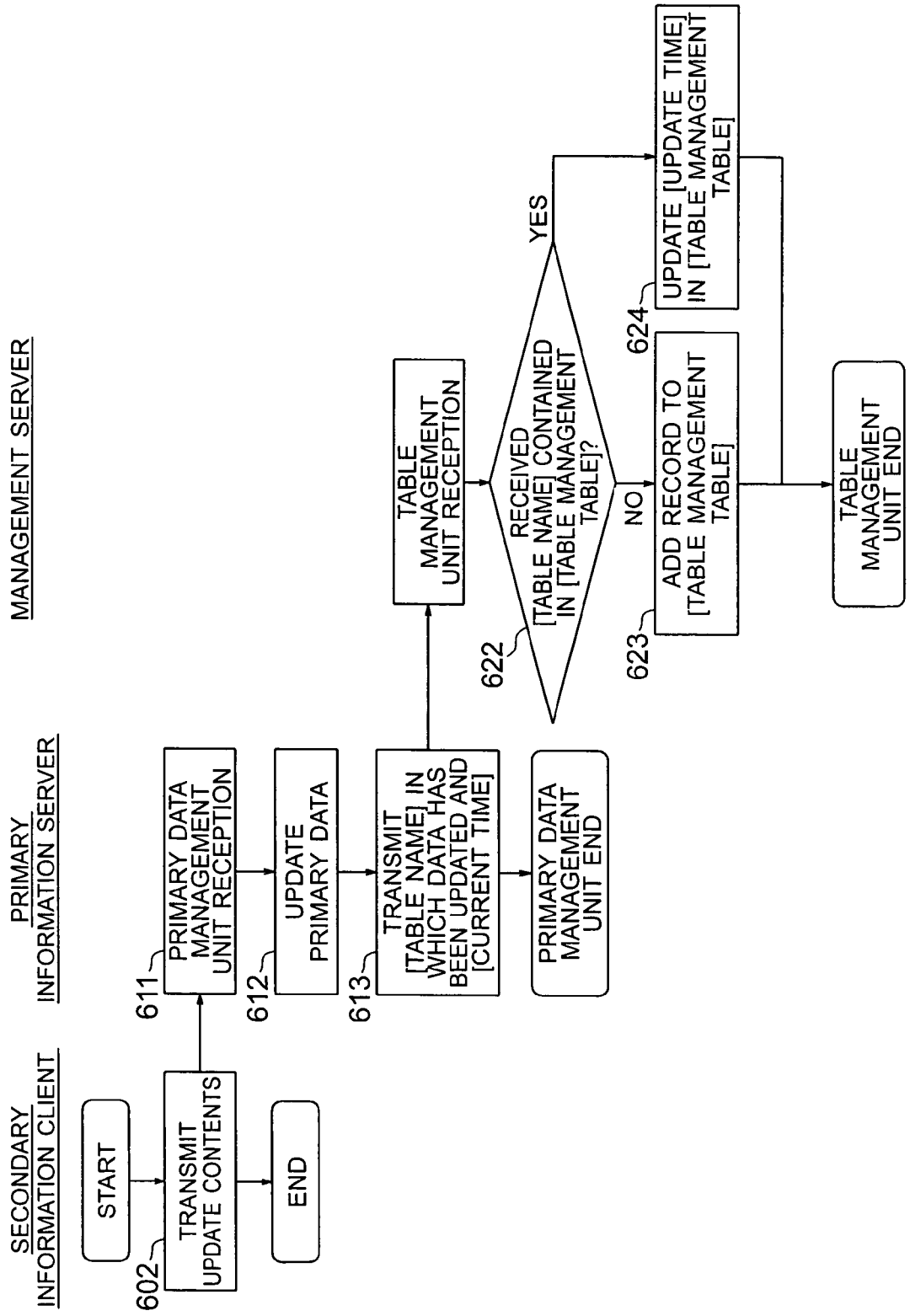
FIG. 6 is a flowchart of primary data updating according to an embodiment.

FIG. 6 is a flowchart of updating external input data 142.

The update processing of the external input data 142 is performed by updating the external input data stored in the primary information server 140 and recording the update time of the updated table in the table management table.

A user of the primary information client 110 activates the primary data update unit 111. The user inputs the update data from the input unit 114 of the primary information client 110. When the input of the data is complete, the primary data update unit 111 transmits the contents of the data to be updated, to the primary information server 140 (step 602). When the transmission of the inputted data is complete, the primary data update unit 111 terminates the processing.

The primary information server 140 receives the contents of the data to be updated (step 611). The primary data management unit 141 updates the external input data 142 stored in the storage device 146 according to the update contents (step 612).

When the update of the external input data 142 is complete, the primary data management unit 141 transmits the table name in which the data has been updated and the current time to the management server 170 (step 613). When the transmission to the management server 170 is complete, the primary data management unit 141 terminates the processing.

The management server 170 receives the table name and the update time of the external input data 142 which has been updated (step 621). If the received table name exists in the table management table 178 ("YES" in step 622), the table management unit 174 overwrites the received update time at the update time of the corresponding record (step 624).

For example, suppose that the table management table 178 is the state shown in FIG. 4B when the received table name is "Table-A" and the update time is "2005/1/3 5:00". Since the table management table 178 contains the record matched with the table name, the table management unit 174 updates the update time from "2005/1/3 3:00" to "2005/1/3 5:00".

On the other hand, if the received table name does not exist in the table management table 178 ("NO" in step 622), the table management unit 174 generates a new record from the received table name and the update time and adds it to the table management table 178 (step 623).

Figure 7:
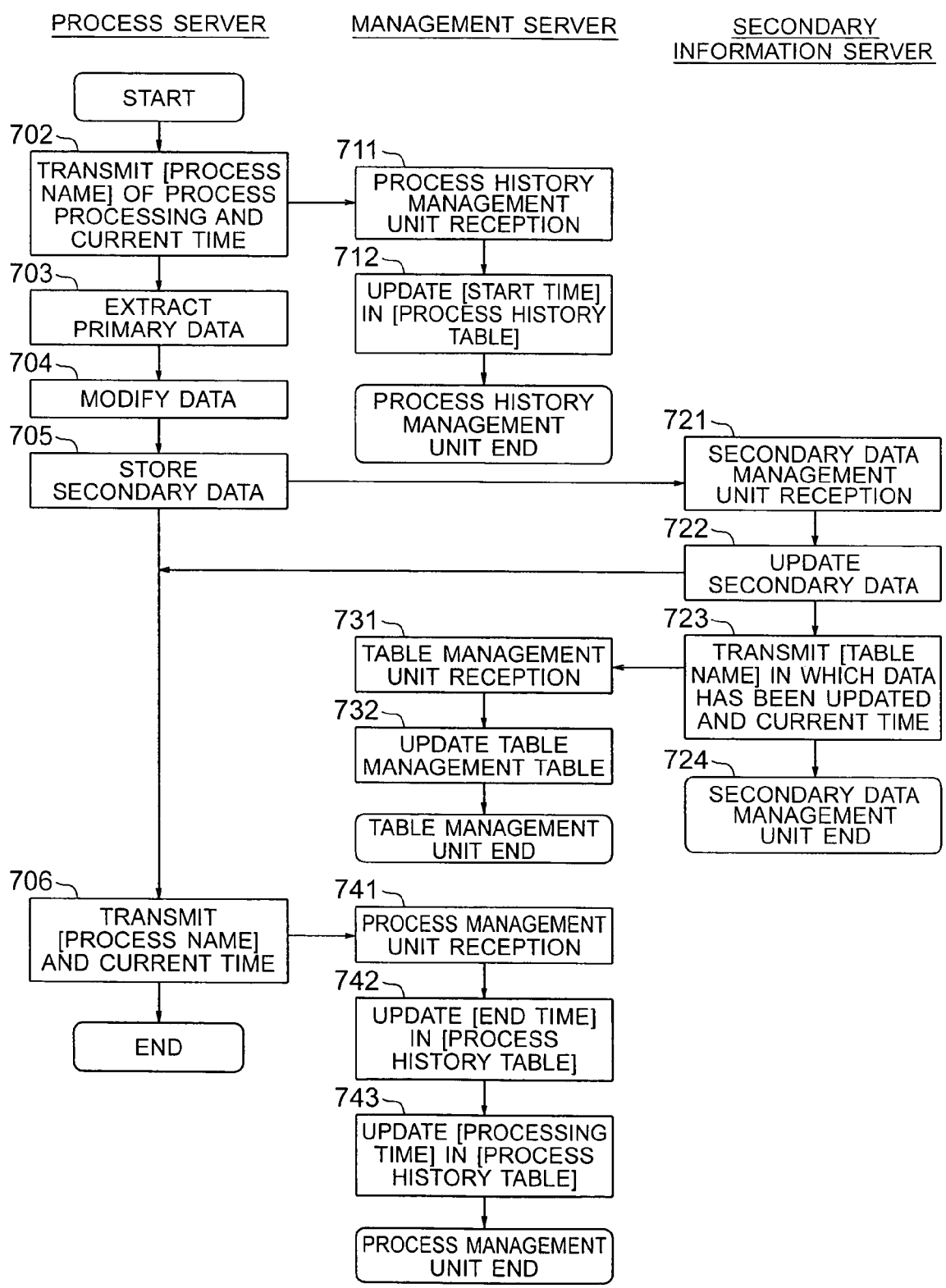
FIG. 7 is a flowchart of process execution according to an embodiment.

FIG. 7 is a flowchart for executing the process stored in the process server 130. The process execution management unit 132 of the process server 130 periodically executes the process stored. Moreover, when necessary, the process may be executed manually.

When a predetermined condition is satisfied, the process execution management unit 132 instructs execution of the specified process. After executing the specified process, the process execution management unit 132 transmits the process name of the executed process and the current time to the management server 170 (step 702).

The process 133 receives the execution command from the process execution management unit 132 and the data extraction unit 134 extracts the primary data (step 703). Subsequently, the data transform unit 135 modifies the primary data extracted (step 704). Furthermore, the data storage unit 136 transmits the generated secondary data to the secondary information server 150 (step 705).

On the other hand, the management server 170 receives the process name and the start time transmitted by the process server 130 (step 711). The process history management unit 173 updates the start time of the corresponding record in the process history table 177 from the received process name (step 712). FIG. 3C shows the state of the process history table 177 at the moment when step 712 is complete. It should be noted that the process history management unit 173 executes the process of step 712 in parallel to the process in the process server 130.

The secondary information server 150 receives the secondary data generated in the process server 130 (step 721). The secondary data management unit 151 adds the received secondary data to the process transform data 152 in the storage device 156 or updates the received secondary data (step 722). Furthermore, the secondary data management unit 151 reports completion of the update of the secondary data to the process server 130. The secondary data management unit 151 transmits the table name in which data has been updated and the current time to the management server 170 (step 723).

The management server 170 receives the table name and the update time of the table containing the updated secondary data (step 731). The table management unit 174 extracts the corresponding record from the received table name and updates the update time (step 732).

On the other hand, the process server 130 transmits the process end information to the management server 170. The process execution management unit 132 receives the report on the completion of the update of the secondary data and transmits the process name being executed and the current time to the management server 170 (step 706).

The management server 170 receives the process name and the end time (step 741). The process history management unit 173 extracts the corresponding record from the received process name and updates the end time (step 742). Furthermore, the process history management unit 173 calculates the processing time from the start time and the end time and updates the processing time (step 743). FIG. 3D shows the state of the process history table 177 at the moment when the process of step 743 is complete.

Figure 8:
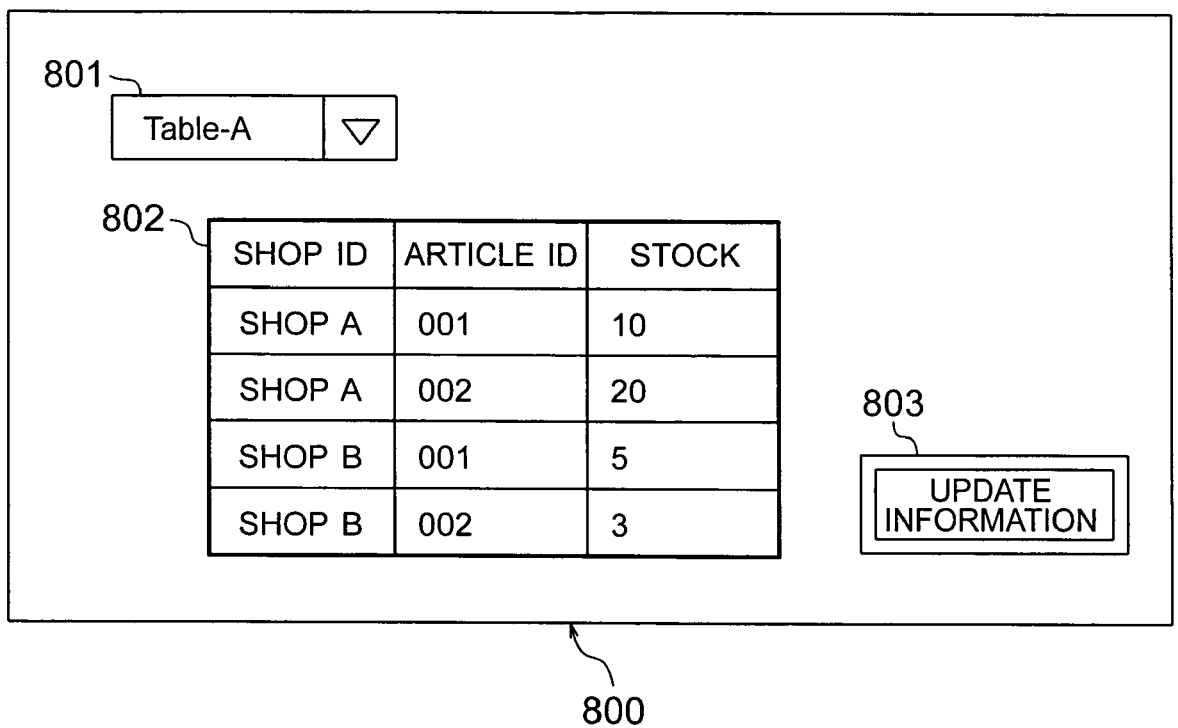
FIG. 8 shows a table reference view according to an embodiment.

FIG. 8 is a table reference view 800 for referencing the table specified by a user. The table reference view is displayed at the output unit 165 by the display unit 162.

The table reference view 800 contains a list 801, a grid 802, and an update information button 803. Moreover, in the table reference view 800, the table referenced from the input unit 164 is selected.

The list 801 selects a table to be referenced. The list 801 contains a list of tables which can be selected. The list 801 has display section for a table name at the left and a button for displaying a table list at the right. When the button at the right is pressed, the display section of the table name is enlarged so that the user can select a table to be referenced.

The grid 802 displays contents of the table selected.

When the update information button 803 is pressed, an update information display view indicating the contents of the update information is displayed. The update information display view will be detailed later with reference to FIG. 16. The update information includes the transform process-associated information and the transform process analysis result.

The transform process-associated information includes primary data, secondary data, and a process required for generating data stored in the specified table, which are organized in a hierarchical structure. Furthermore, to the primary data and the secondary data, the update time is added. To the process, the start time, the end time, the expected next start time, and the processing time are added.

The transform process analysis result includes the update state of the specified table, the process required for updating to the latest state, necessary processing time, and the expected next update time.

Figure 9:
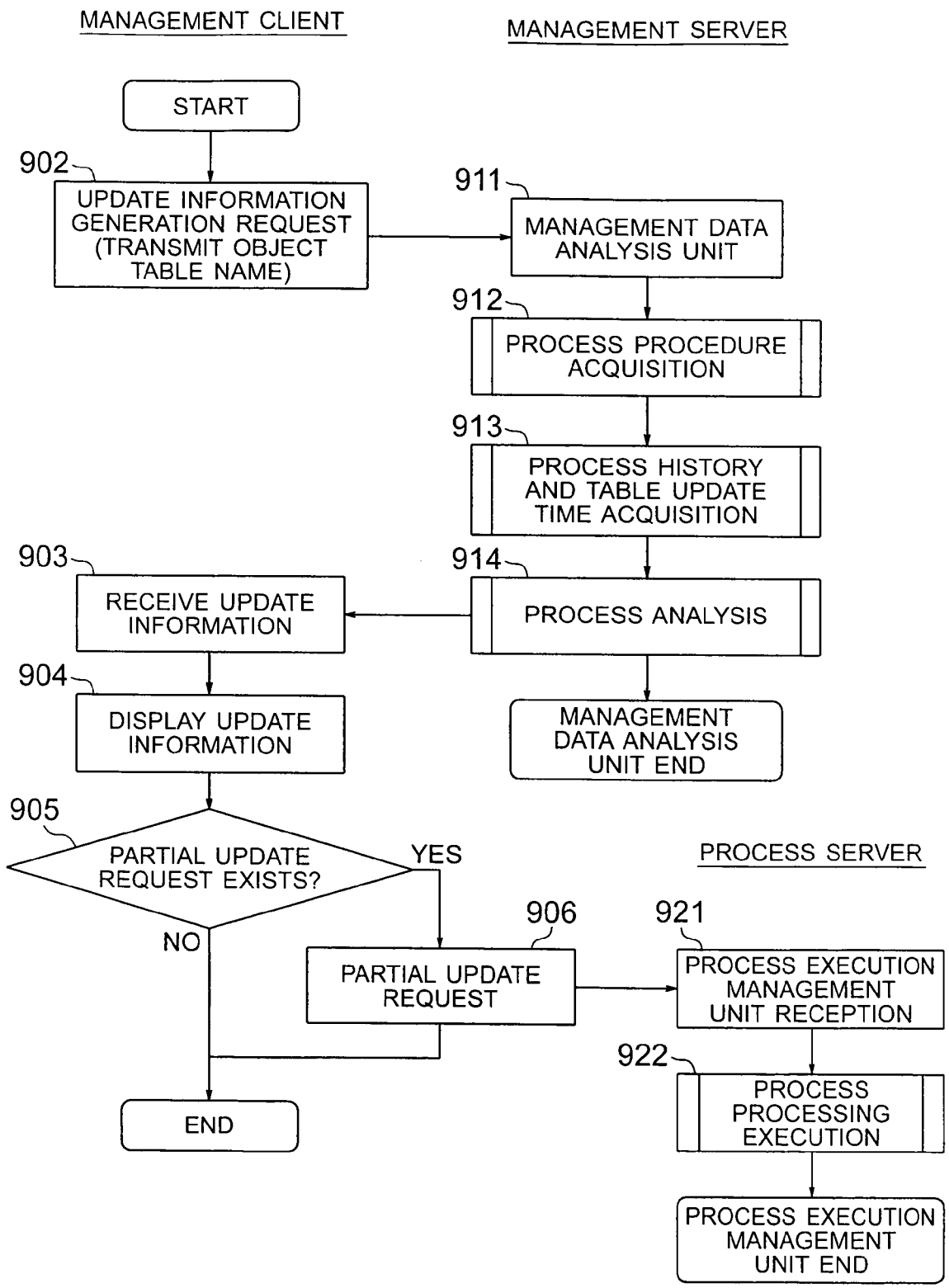
FIG. 9 is a flowchart of display of table update information and a partial update request according to an embodiment.

FIG. 9 is a flowchart of the processing for acquiring and displaying the update information.

When the update information button 803 in the table reference view shown in FIG. 8 is pressed, the management client 160 request the management server 170 to acquire update information. The management client 160 receives the update information acquired and created by the management server and displays the contents of the information. The user references the update information displayed and executes a partial update request if necessary, thereby updating the specified table to the latest state.

Here, generation of the update information will be detailed. When the update information button 803 in the table reference view 800 shown in FIG. 8 is pressed, the user request reception unit 161 requests the management server 170 to acquire update information and transmits a table name as an object (step 902).

The management server 170 receives the table name of the table from which update information is to be acquired (step 911).

The management data analysis unit 171 executes the process procedure generation processing according to the received table name (step 912). The process procedure generation processing acquires a column and a process required for creating data stored in the specified table and builds a hierarchical structure according to the creation order. The hierarchical structure corresponds to the transform process-associated information of the update information. It should be noted that specific contents of the process procedure generation processing will be detailed later with reference to FIG. 10 and FIG. 11.

The hierarchical structure built by the process procedure generation processing includes only correspondence between the primary data, the secondary data, and the process. The management data analysis unit 171 adds information such as the update time to the hierarchical structure (step 913). It should be noted that specific contents of the processing will be detailed later with reference to FIG. 12 and FIG. 13.

The management data analysis unit 171 executes process analysis processing according to the built hierarchical structure (step 914).

The process analysis processing judges whether the specified table in the latest state. If the specified table is not in the latest state, the management data analysis unit 171 extracts a process required for updating the specified table to the latest state, from the transform process-associated information. Furthermore, the time required for updating the specified table is calculated according to the extracted process processing time and the like. It should be noted that specific contents of the processing will be detailed later with reference to FIG. 14 and FIG. 15.

When the process analysis is complete, the management data analysis unit 171 transmits update information as the analysis result to the management client 160.

When the management client 160 has received the update information (step 903), the display unit 162 displays the received update information (step 904). Furthermore, when the user request reception unit 161 receives a partial update request from a user ("YES" in step 905), it requests for execution of a process required for updating the table to the latest state (step 906).

The process server 130 receives a process name to be executed, from the management client 160 (step 921). The process execution management unit 136 successively executes the specified processes (step 922). It should be noted that the specified processes are executed according to the flowchart shown in FIG. 7.

Figure 10:
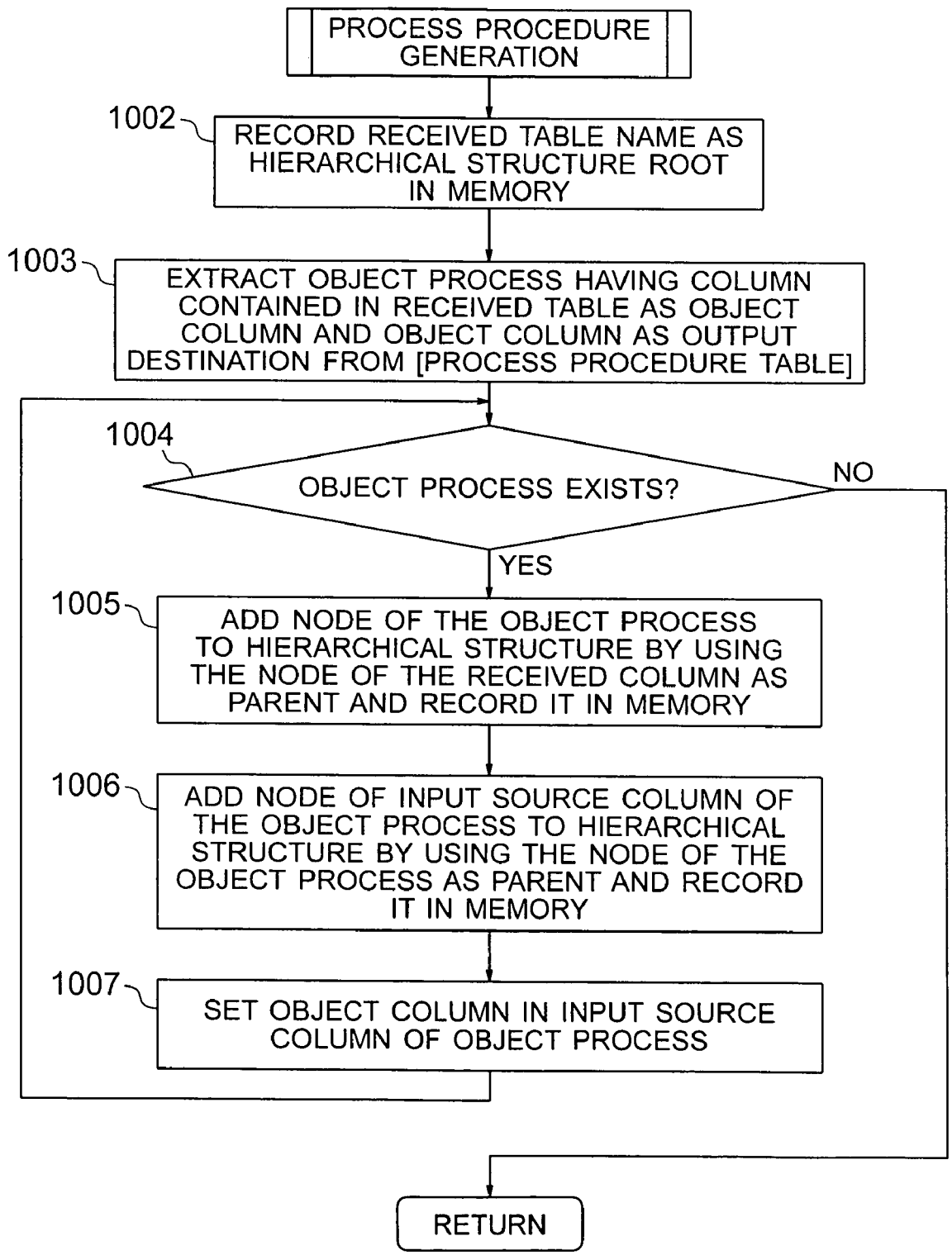
FIG. 10 is a flowchart of a process procedure generation processing according to an embodiment.
Figure 11:
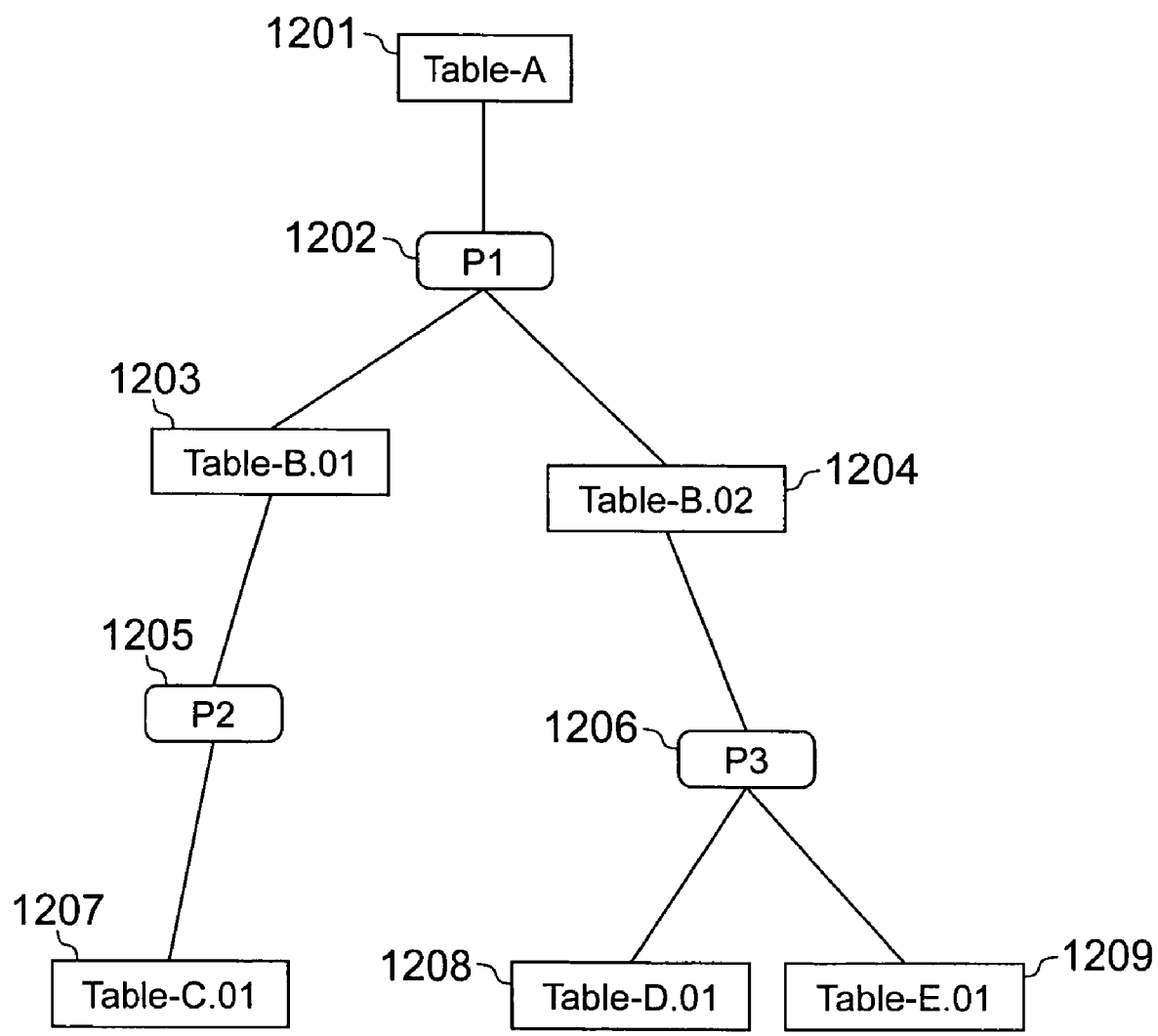
FIG. 11 shows a hierarchical structure stored in a memory after completion of process procedure generation processing according to an embodiment.

FIG. 10 is a flowchart for building a hierarchical structure having a column and a process required for creating data in the specified table as nodes. FIG. 11 shows a hierarchical structure built according to the flowchart of FIG. 10.

The management data analysis unit 171 records the received table "Table-A" as a route node of the hierarchical structure in the memory 181 of the management server 170 (step 1002). The processing of step 1003 and after is executed for all the columns in the received table.

The management data analysis unit 171 extracts a process (object process) having a column (object column) to be processed as an output destination from the process procedure table 176 (step 1003). Here, as shown in FIG. 2B, "Table A.01" is an output destination of the process "P1". Accordingly, the management data analysis unit 171 extracts the process "P1" having the "Table-A.01" as the output destination from the process procedure table 176.

It should be noted that in FIG. 2B, only column "01" of "Table-A" is shown for simplifying the explanation. However, actually, a plurality of columns exist. The route node of the hierarchical structure contains all the columns in the received table "Table-A".

When the management data analysis unit 171 extracts an object process ("YES" in step 1004), the object process is added to the hierarchical structure so that the object column becomes a parent and is recorded in the memory 181 (step 1005). Accordingly, as shown in FIG. 11, a node 1202 corresponding to the process "P1" is added to the route node 1201 corresponding to the "Table-A". It should be noted that if no object process exists ("NO" in step 1004), the data analysis unit 171 terminates the processing.

Furthermore, the management data analysis unit 171 acquires an input source column of the object process. The input source column 203 is added to the hierarchical structure so that the object process becomes a parent and is recorded in the memory 181 (step 1006). As shown in FIG. 2B, the input source column of the process "P1" is "Table-B.01" and "Table-B.02". As shown in FIG. 11, the management data analysis unit 171 adds nodes 1203 and 1204 corresponding to the "Table-B.01" and the "Table-B.02" to the lower hierarchy of the node 1202 (step 1006).

The management data analysis unit 171 repeatedly executes the processes of steps 1004 to 1006 on the added input source columns as the object columns (step 1007) until no object process exists. In the hierarchical structure shown in FIG. 11, the processes of steps 1003 to 1006 are executed on the object columns "Table-B.01" and "Table-B.02".

When the object column is "Table-B.01", the management data analysis unit 171 extracts the process "P2" and column "Table-C.01". Moreover, when the object column is "Table-B.02", the management data analysis unit 171 extracts the process "P2" and columns "Table-D.01" and "Table-E.01". Thus, nodes 1205 to 1209 are added to the hierarchical structure, thereby completing the hierarchical structure shown in FIG. 11.

In the hierarchical structure, the output data is placed at an upper hierarchy and the input data is placed at a lower hierarchy. Moreover, connection between the respective nodes is a directional branch directed from the data output destination toward the input source. At this stage, the hierarchical structure is a tree structure (directional tree). Furthermore, a table or a column and a process are alternately arranged at the route from the root node to a leaf node of the hierarchical structure. Moreover, each leaf node corresponds to a column.

Figure 12:
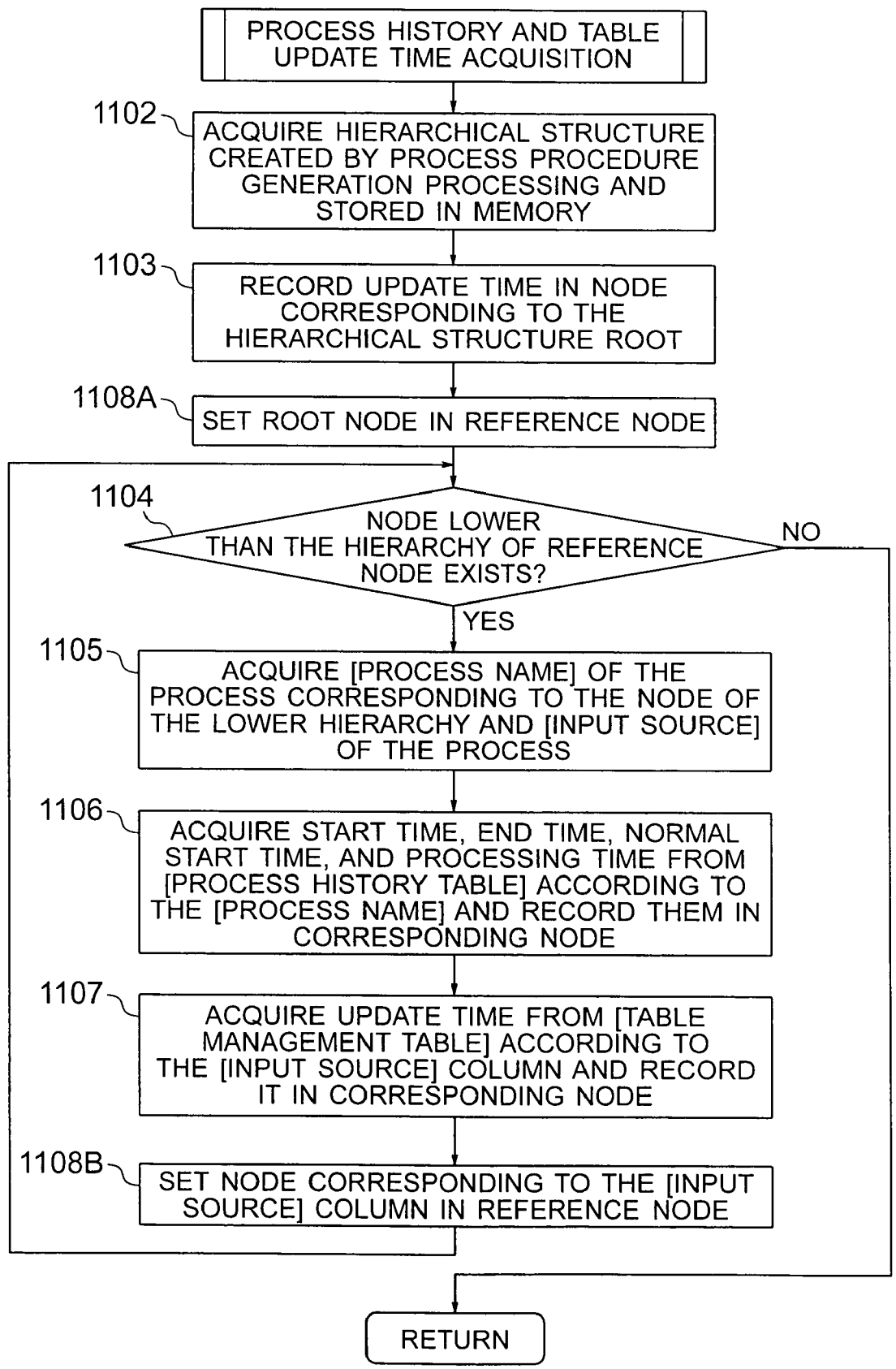
FIG. 12 is a flowchart of an update information generation processing according to an embodiment.
Figure 13:
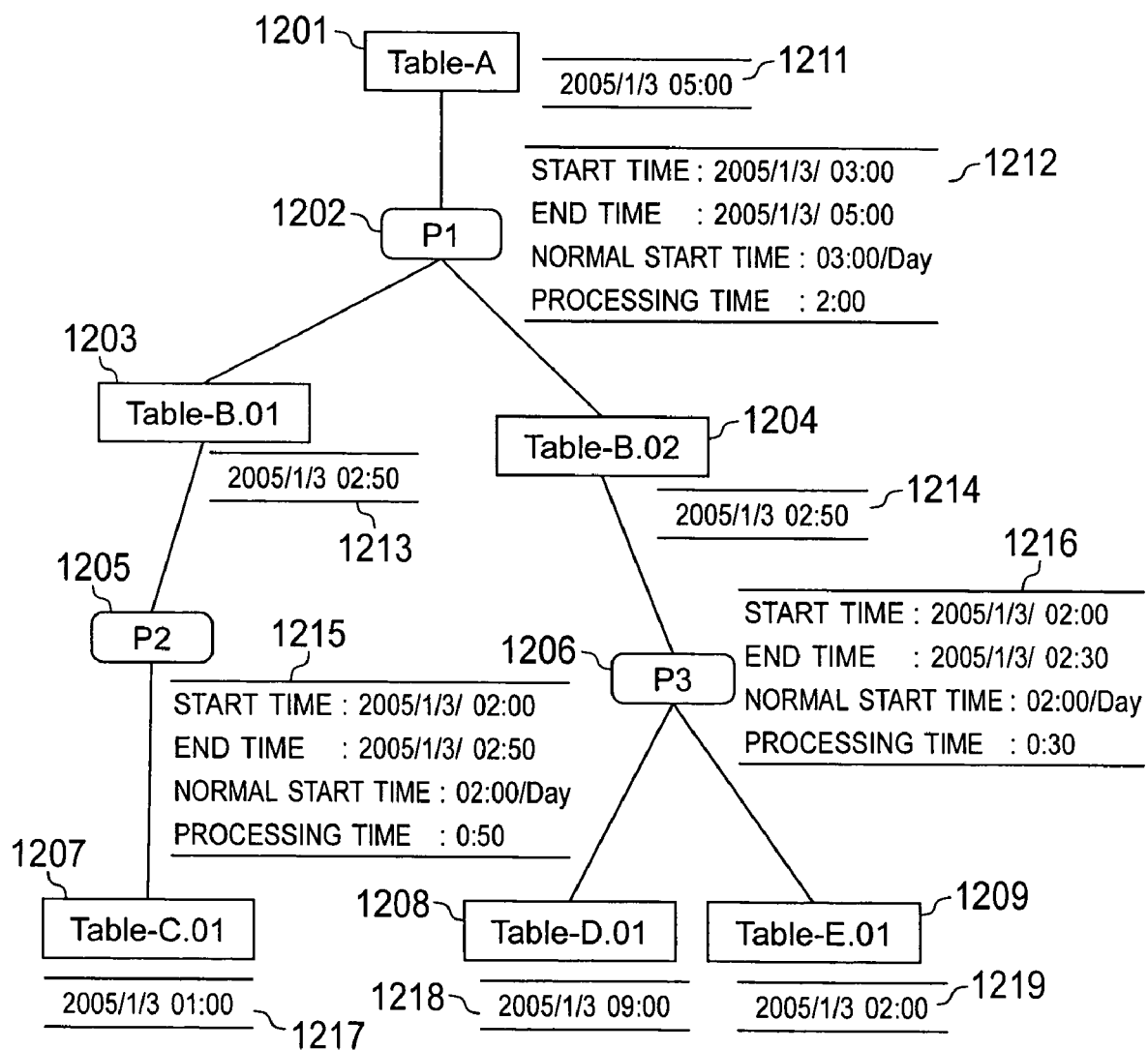
FIG. 13 shows a hierarchical structure stored in a memory after completion of the update information generation processing according to an embodiment.

FIG. 12 is a flowchart for adding update information to the hierarchical structure. FIG. 13 shows a hierarchical structure in which update information is added to the hierarchical structure shown in FIG. 11 according to the flowchart of FIG. 12.

The management data analysis unit 171 adds information on the update time and the like to each of the nodes in the hierarchical structure built by the process procedure generation process (step 912). When the node corresponds to a table or a column, the update time is added. When the node corresponds to a process, a process history is added.

Firstly, the management data analysis unit 171 acquires the hierarchical structure recorded in the memory 181 (step 1102).

Next, the management data analysis unit 171 adds the update information 1211 to the root node 1201. The root node corresponds to "Table-A" received by the management server 170. The management data analysis unit 171 extracts the update time 402 of "Table-A" from the table management table 178 and records it in the update information 1211 of the root node 1202 (step 1103).

The management data analysis unit 171 sets a root node 1201 as the current node (step 1108A). The current node is a node serving as a reference for searching for a lower hierarchy. The current node is temporarily recorded in the memory 181 while processing for adding the update information is being executed.

When a node is concatenated to the lower hierarchy of the current node ("YES" in step 1104), the management data analysis unit 171 acquires information corresponding to a node of a lower hierarchy (step 1105).

Referring to FIG. 13, the root node 1201 as the current node at this moment is concatenated to the node 1202. The node 1202 corresponds to the process "P1". Furthermore, the node 1202 is concatenated to the node 1203 and the node 1204. The node 1203 corresponds to the input source column "Table-B.01" of the process "P1". Similarly, the node 1204 corresponds to the input source column "Table-B.02" of the process "P1".

The management data analysis unit 171 records the process history of the process corresponding to the node of the lower hierarchy of the current node (step 1106). The management data analysis unit 171 acquires the process history of the process "P1" from the process history table 177. The management data analysis unit 171 records the update information 1212 of the process "P1" in the node 1202. The update information 1212 to be recorded includes the start time, the end time, the normal start time, and the processing time of the process "P1".

Furthermore, the management data analysis unit 171 records the update time of the table containing the input source column in the corresponding node (step 1107). The table update time is acquired from the table management table 178. Accordingly, the management data analysis unit 171 acquires the update time of the table "Table-B" including "Table-B.01" and "Table-B.02" and records them in the update information 1213 and 1214, respectively.

After this, the management data analysis unit 171 executes the processing of steps 1104 to 1108B by using the reference node as the input source column (step 1108B). The management data analysis unit 171 repeats the processes of steps 1104 to 1108B until the update information (1215-1219) are added to the remaining nodes (1205-1209). When the update information is added to all the nodes and no node exists at the lower hierarchy of the reference node ("NO" in step 1104), the processing is terminated.

Figure 15A:
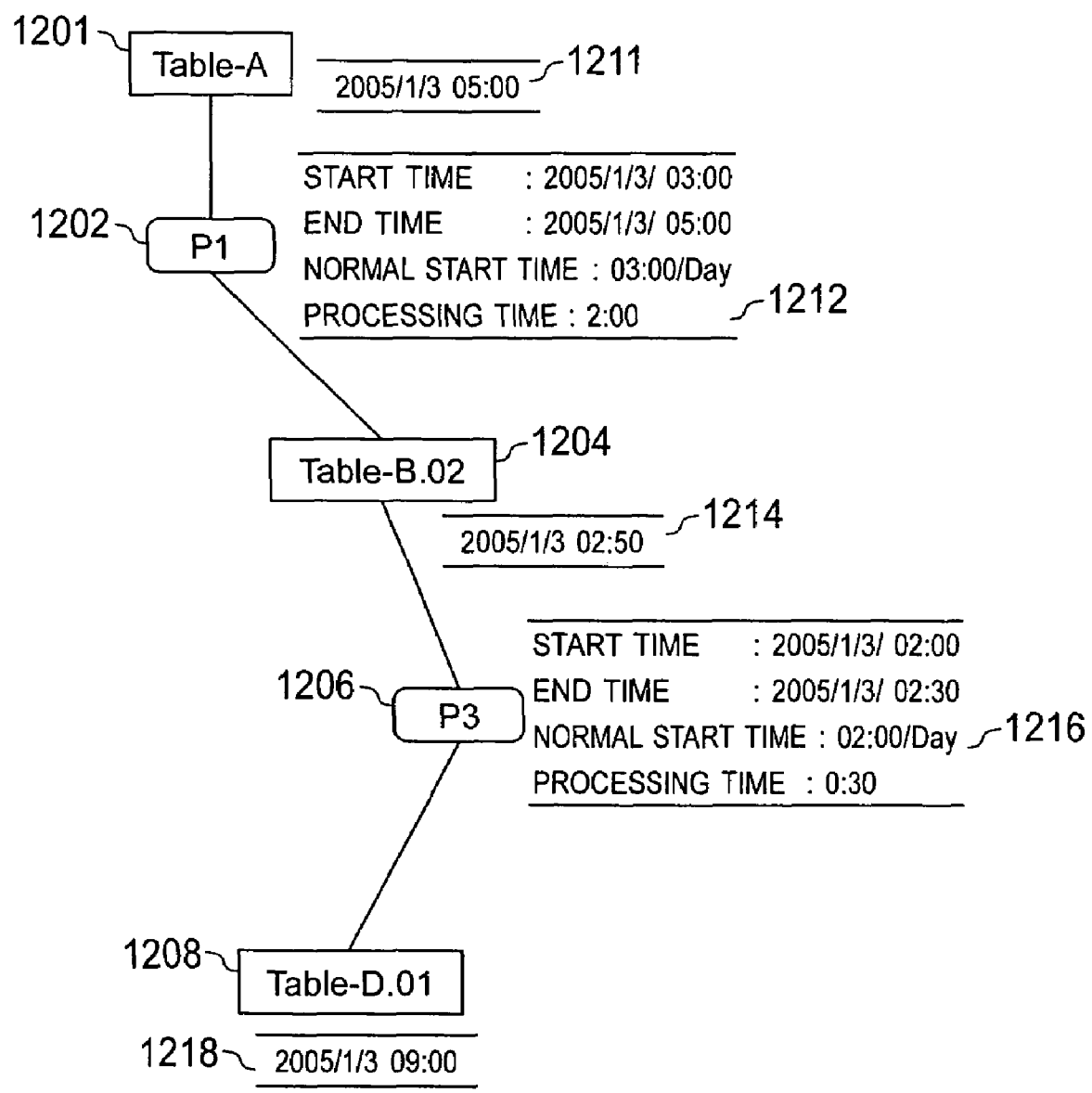
FIG. 15A shows a hierarchical structure built by the process analysis processing according to an embodiment.

FIG. 14 is a flowchart for analyzing the modification process-associated information in FIG. 13. FIG. 15A shows a hierarchical structure built by the process required for making the secondary data the latest. FIG. 15B shows a modification process analysis result.

The management data analysis unit 171 executes process analysis according to the hierarchical structure to which update information has been added by the update information generation process (step 913). The management data analysis unit 171 specifies primary data updated after creation of the secondary data.

The management data analysis unit 171 firstly copies the hierarchical structure recorded in the memory 181 (step 1302).

Next, the management data analysis unit 171 compares the update information recorded in the respective nodes. Here, the update time of the output destination column is always after the process completion time. On the other hand, the update time of the input source column may be modified by another process after the start time of the process as an object.

The management data analysis unit 171 compares the process start time to the process input source column update time (step 1303). The management data analysis unit 171 successively compares the respective nodes starting from the root node 1202 toward the lower hierarchy.

If the process start time is newer than the input source column update time for all the processes, it can be judged that "Table-A" is in the latest state ("YES" in step 1303). Here, the management data analysis unit 171 records "the latest data" in the update state 141 of the transform process analysis result (step 1310). The management data analysis unit 171 transmits the transform process-associated information of FIG. 13 and the transform process analysis result of FIG. 15B to the management client 160 (step 1311) and terminates the processing.

On the other hand, if there exists a process having the input source column update time newer than the start time ("NO" in step 1303), the input source column is updated after the process execution. Accordingly, the management data analysis unit 171 records "not the latest data" in an update state 1411 (step 1304).

Here, referring to FIG. 13, the update time of the column "Table-D.01" corresponding to the node 1209 is newer than the start time of the process "P3" using this column as the input source. Accordingly, it is known that the update result of "Table-D.01" is not reflected in "Table-B.02". Furthermore, it is known that no reflection is performed for the nodes of the upper hierarchy than the node 1204 corresponding to "Table-B.02".

It should be noted that the judgment whether the update of the primary data is reflected may be performed by comparing the time elapse from the moment when the input source column of each process is updated to the moment when the output destination column is updated to the time elapse predetermined for each process. When this predetermined time elapse is made as a standard processing time of each process, if the output destination column is updated before the standard processing time elapses after the input source column is updated, it can be judged that the input source column is updated after the process execution. Moreover, it is possible to set this predetermined time elapse to "0" so that the user can update the value at an arbitrary moment.

The management data analysis unit 171 deletes a column in which the update of the primary data is reflected and a process not to be executed, from the hierarchical structure (step 1305).

More specifically, the input source column "Table-B.01" of the process "P1" has the update time older than the start time of the process "P1". Furthermore, the start time of the process "P2" having "Table-B.01" as the output destination column is newer than the update time of the input source column "Table-C.01". Accordingly, "Table-B.01" is in the latest state and need not be updated. Consequently, as shown in FIG. 13, the branch concatenating the process "P1" and the column "Table-B.01" is cut off and the lower node is deleted. Moreover, for the input source column "Table-E.01" of the process "P3", the node 1209 is similarly deleted.

Thus, it is possible to build a hierarchical structure having only a process to be executed, an input source column, and output destination column as components (FIG. 15A). Here, if there are a plurality of nodes indicating the same process, these nodes are merged (step 1306). As a result, the hierarchical structure is not a tree structure but a directed graph having no cyclic route.

FIG. 15A shows an analyzed hierarchical structure built by the aforementioned processing. The management data analysis unit 171 generates a transform process analysis result according to the analyzed hierarchical structure shown in FIG. 15A.

The management data analysis unit 171 lists the processes contained in the analyzed hierarchical structure and records them in the latest process 1412 (step 1307).

The management data analysis unit 171 estimates the time required for updating the table to be referenced, to the latest state and records it in the partial update time required 141 (step 1308). More specifically, the required time is estimated by summing the process times of the nodes 1202 and 1206 corresponding to the process among the nodes 1202, 1204, and 1206 through which the route from the root node 1201 to the leaf node 1208 passes. Accordingly, the processing time "0:30" of the process "P1" and the processing time "2:00" of the process "P3" are added and the obtained time "2:30" is recorded as the partial update time required 1413.

The management data analysis unit 171 records the time to update the secondary data referenced by the batch processing which is periodically performed to the latest state in the next update plan 1414 (step 1309). The expected next update time is the time obtained by adding the processing time to the normal start time of the process concatenated to the root node 1202. When there are a plurality of processes concatenated to the root node 1202, the latest time among the times obtained by adding the processing time to the normal start time of each process is decided to be the expected next update time.

When the aforementioned processing is complete, the management data analysis unit 171 transmits the transform process-associated information of FIG. 13 and the transform process analysis result of FIG. 15B to the management client 160 (step 1311) and terminates the processing.

FIG. 16 shows a view displaying the update information on "Table-A". At the left half of the view, transform process-associated information 1502 on the "Table-A" is displayed. Moreover, at the right half of the view, transform process analysis result 1503 of the "Table-A" is displayed.

The display unit 162 of the management client 160 receives the transform process-associated information (FIG. 13) and the transform process analysis result (FIG. 15B) from the management data analysis unit 171 of the management server 170 and outputs them to the output unit 165. Furthermore, the current time is acquired from the management client and the current time 1501 is displayed at the upper right of the view.

The user can reference the process and the column creating data stored in the specified table. Here, the display unit 162 may distinguish the columns to be updated and the columns not to be updated when displaying them. Thus, the user can recognize the secondary data affected by the update of the specified table.

Moreover, the user can reference the update state 1511 of the transform process analysis result 1503 so as to check whether the specified table in the latest state. When the specified table is not in the latest state, the display unit 162 displays a partial update request button 1504 at the lower right if the view.

The user can reference the process 1512 executed for updating the specified table to the latest state, the partial update time required 1513, and the expected next update time 1514 so as to judge whether to execute the partial update.

The user can execute the partial update and update the specified table to the latest state (step 906) by pressing the partial update request button 1504 ("YES" in step 905).

Furthermore, the partial update may execute a pre-specified process instead of executing a process extracted by the process analysis. The pre-specified process is, for example, a group of processes closely associated with the process creating secondary data according to the updated primary data. By executing processes in a group, it is possible to update the closely associated secondary data in a batch mode.

Figure 17A:
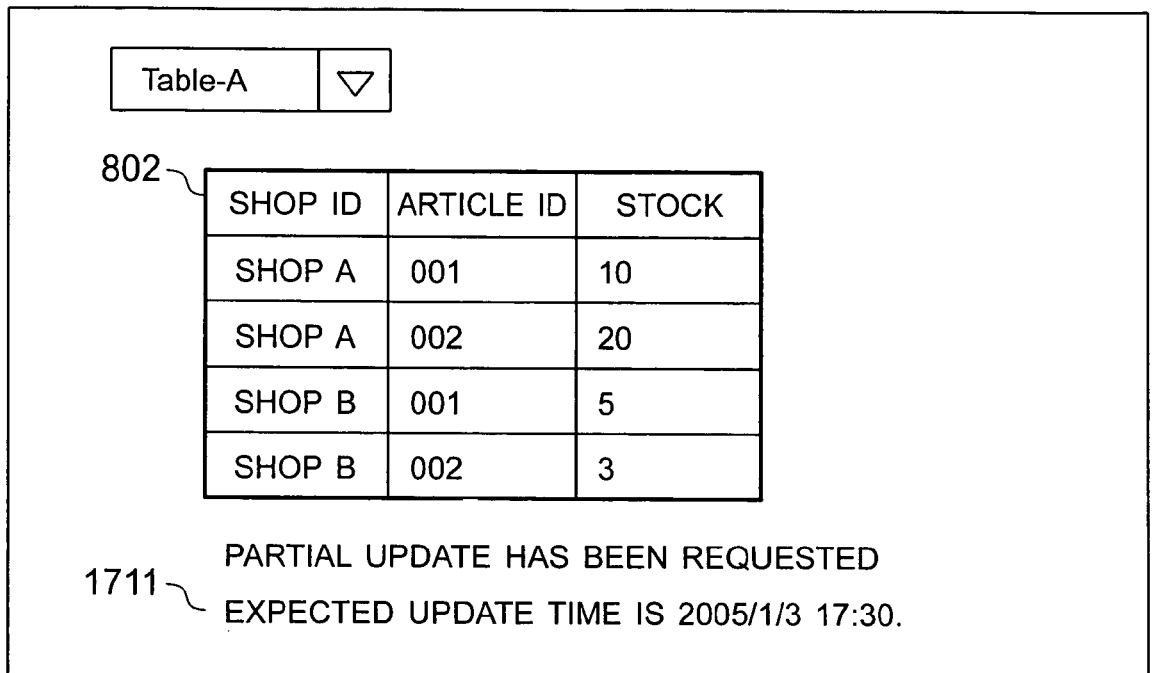
FIG. 17A shows a table reference view immediately after execution of the partial update request processing according to an embodiment.
Figure 17B:
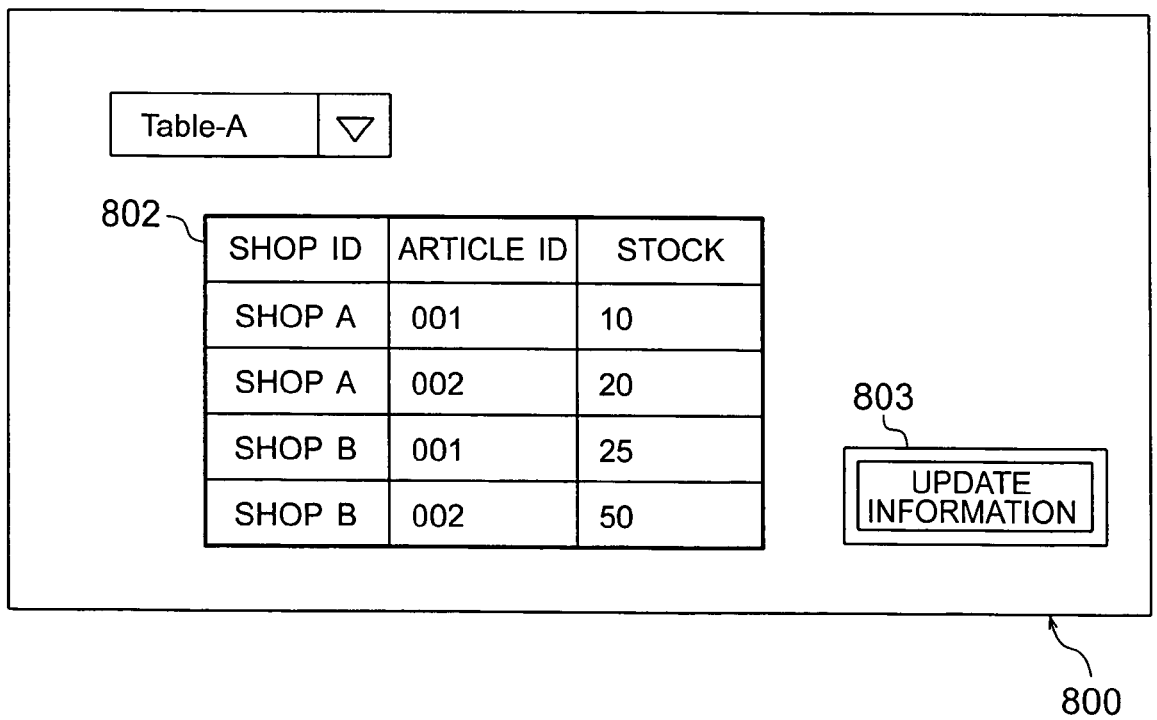
FIG. 17B shows a table reference view after completion of the partial update request processing according to an embodiment.

When the partial update request button 1504 of FIG. 16 is pressed, the display unit 162 temporarily erases the view and displays the table reference view 800 for referencing the contents of the specified table. FIG. 17A and FIG. 17B shows the displayed table reference view 800.

FIG. 17A shows the table reference view displayed immediately after the partial update request button 1504 is pressed. The display unit 162 displays the message that the partial update has been executed and the expected time of the update completion in the area 1711. The expected time of update completion is calculated by adding the partial update time required 1513 of the transform process analysis result 1503 to the current time 1501 of FIG. 16. Here, in the background, the specified processes are successively executed according to the flowchart shown in FIG. 7.

After this, upon completion of the partial update, the table reference view 800 is displayed and the contents of "Table-A" after the update are displayed as shown in FIG. 17B.

FIG. 17B shows a view for displaying update information on "Table-A". When the update information button 803 of the FIG. 17B is pressed, the management server 170 executes processing according tot he flowchart shown in FIG. 9. The management client 160 receives update information after completion of the partial update and displays the view shown in FIG. 17C.

Figure 17C:
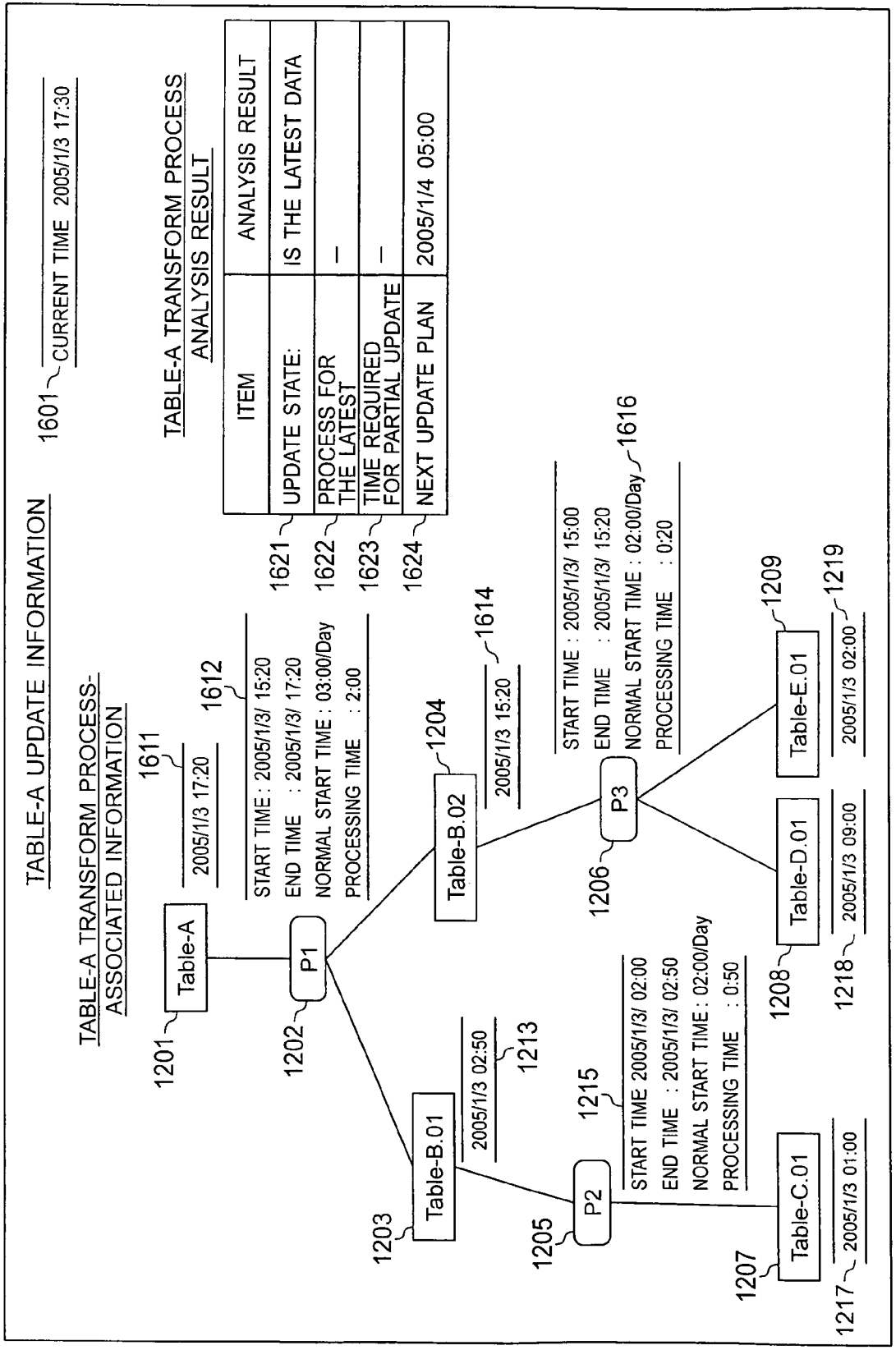
FIG. 17C shows update information after completion of the partial update request processing according to an embodiment.

FIG. 17C shows update information after the partial update (time 17:30) as shown by the current time 1601. As compared to the moment (time 15:00) of FIG. 16, the column and process update information (1611 to 1616) in the transform process-associated information and items (1621 to 1624) of the transform process are updated. The user can know that the table specified in FIG. 17B is in the latest state from the information indicating "the latest information" in the update state 1621.

According to the present embodiment, the management server 160 builds a hierarchical structure showing relationship between a process creating data stored in the specified table and the data. The management server 160 can execute process analysis according to the hierarchical structure acquired so as to check the update state of the specified table. Furthermore, since the next update time of the specified table and the estimation time required for updating to the latest state are displayed, the user can judge whether to execute the update according to these information.

Moreover, since the process required for updating the table specified by the process analysis to the latest state is known, the management server 160 can cause the process server 130 to execute the minimum process. Thus, the management server 160 can update the specified table to the latest state. Moreover, since the process executed can be minimized, it is possible to reduce the server resource consumption amount. Furthermore, when the device storing the data is in a distributed arrangement like in this embodiment, it is possible to reduce the network traffic amount.

On the other hand, in this embodiment, the process and the primary data are specified from the secondary data referenced, but it is also possible to specify the associated secondary data from the primary data.

In brief, a process having a column corresponding to the primary data as an input source column is acquired from the process procedure table 176. Furthermore, the acquired output destination column is made an input source column and the process is similarly acquired repeatedly, thereby building a hierarchical structure having the primary data as a root node.

By referencing the hierarchical structure thus obtained, it is possible to easily check the secondary data affected by modification of the primary data.

It should be noted that the update information on each node can be added by using the flowchart of FIG. 12. By analyzing the hierarchical structure to which the update information is added and calculating the time of each route from the root node to the leaf node, it is possible to acquire the time required for updating the secondary data.

Furthermore, this embodiment is formed by a plurality of servers and clients but it is also possible to apply this embodiment to a stand-alone environment.

Moreover, this invention may be applied to a system other than the inventory control system. For example, this invention may be applied to a production control system in a factory. Suppose that the end product is completed by manufacturing an intermediate product by processing or combining a plurality of materials and combining the intermediate products. Here, the primary data corresponds to the material or the intermediate product and the secondary data corresponds to the intermediate product or the end product. When re-calculating the initial cost of the end product according to the modification of the initial cost of the material, the process for calculation of the initial cost may be executed for the intermediate product and the end product using the material whose initial cost has been modified.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data processing method for creating requested secondary data by a program in which a data creation procedure is pre-defined according to primary data in a data processing system comprising:
   a processor;
   a memory accessible from the processor;
   a storage device;
   an input unit;
   an output unit,
   wherein the memory stores the program,
   wherein the storage device stores the primary data, the secondary data, and data update information including update time of the primary data, and update time of the secondary data,
   executing the program for creating the requested secondary data if a relationship between the data update information on the primary data and the secondary data used for creating the requested secondary data and the data update information on the requested secondary data does not satisfy a predetermined condition when generation of the secondary data is requested, and
   outputting the primary data and the secondary data to the output unit while correlating the primary data to the secondary data, wherein the primary data and the secondary data which are outputted have a hierarchical structure formed by the secondary data as an upper hierarchy layer, and either one of the primary data or the secondary data as a lower hierarchy layer viewed from the program creating the secondary data, and
   wherein the hierarchical structure is expressed by a directed graph formed by nodes corresponding to the primary data, the secondary data, and the program, and a directed branch connecting the nodes and directed from the upper hierarchy layer to the lower hierarchy layer.

2. The data processing method as claimed in claim 1, wherein the predetermined condition is that creation time of the primary data used for creating the requested secondary data and the secondary data is newer than start time of the program creating the requested secondary data.

3. The data processing method as claimed in claim 1, wherein the predetermined condition is that a time elapse from a moment when the primary data is created to a moment when the secondary data is created does not exceed a predetermined time elapse.

4. The data processing method as claimed in claim 1, wherein the storage device stores a process history including a start time, an end time, a normal start time, and a processing time of the program,
  wherein the processor records an update time in the data update information when the primary data and the secondary data are updated, and records a start time and an end time in the process history when the program is executed, and
  wherein the output unit correlates the primary data to the secondary data and outputs the data update information and the process history in response to an output request.

5. The data processing method as claimed in claim 1, wherein when the primary data is updated, an update time of the secondary data to be created according to the updated primary data is specified.

6. The data processing method as claimed in claim 1, wherein when the primary data is updated, a program for creating secondary data according to the updated primary data or secondary data created from the updated primary data is specified and a program required for updating the secondary data is executed.

7. The data processing method according to claim 1, further comprising: executing the program for creating the requested secondary data, if the relationship between the secondary data and the data update information of the requested secondary data does not satisfy a predetermined condition.

8. A data processing method for creating requested secondary data by a program in which a data creation procedure is pre-defined according to primary data in a data processing system comprising:
  a processor;
  a memory accessible from the processor;
  a storage device;
  an input unit;
  an output unit,
  wherein the memory stores the program,
  wherein the storage device stores the primary data, the secondary data, and data update information including update time of the primary data, and update time of the secondary data,
  executing the program for creating the requested secondary data if a relationship between the data update information on the primary data and the secondary data used for creating the requested secondary data and the data update information on the requested secondary data does not satisfy a predetermined condition when generation of the secondary data is requested;
  judging whether the requested secondary data is the latest; and
  outputting the judgment result whether the requested secondary data is the latest, wherein the primary data and the secondary data which are outputted have a hierarchical structure formed by the secondary data as an upper hierarchy layer, and either one of the primary data or the secondary data as a lower hierarchy layer viewed from the program creating the secondary data, and
  wherein the hierarchical structure is expressed by a directed graph formed by nodes corresponding to the primary data, the secondary data, and the program, and a directed branch connecting the nodes and directed from the upper hierarchy layer to the lower hierarchy layer.

9. The data processing method as claim in claim 8, wherein the output unit outputs an expected update time of the requested secondary data when the requested secondary data is not the latest.

10. The data processing method as claimed in claim 8, wherein the processor calculates a time required for updating the requested secondary data to the latest secondary data if the requested secondary data is not the latest, and wherein the output unit outputs the calculated time required for updating the requested secondary data to the latest secondary data.

11. The data processing method as claimed in claim 8, wherein the processor specifies a program required for updating the requested secondary data and executes the specified program if the requested secondary data is not the latest.

12. The data processing method as claimed in claim 11, wherein the output unit outputs information including the secondary data updated by the necessary program.

13. The data processing method as claimed in claim 8, wherein the processor executes a pre-specified program and outputs information including the secondary data updated by the pre-specified program if the requested secondary data is not the latest.

14. The data processing method according to claim 8, further comprising: executing the program for creating the requested secondary data, if the relationship between the secondary data and the data update information of the requested secondary data does not satisfy a predetermined condition.

15. A secondary data creation system for creating requested secondary data by a program in which a data creation procedure is pre-defined according to primary data, the secondary data creation system comprising:
  a primary information client;
  a management client;
  a management server;
  a memory which stores the program in which the data creation procedure is pre-defined; and
  a process server which are connected to one another by a network,
  wherein the primary information client includes a primary data update unit for inputting and updating the primary data,
  wherein the management client includes a request reception unit for receiving a secondary data update request from a user and transmitting the request to the management server,
  wherein the management server includes a process analysis unit for receiving the update request transmitted from the management client, specifying a program required for updating the secondary data for which the update request has been received, and transmitting an execution instruction of the necessary program to the process server,
  wherein the process server includes a process storage unit for storing a plurality of the programs and a process execution management unit for executing the programs; and the processor outputs the primary data and the secondary data to the output unit while correlating the primary data to the secondary data, wherein the primary data and the secondary data which are outputted have a hierarchical structure formed by the secondary data as an upper hierarchy layer, and either one of the primary data or the secondary data as a lower hierarchy layer viewed from the program creating the secondary data, and wherein the hierarchical structure is expressed by a directed graph formed by nodes corresponding to the primary data, the secondary data, and the program, and a directed branch connecting the nodes and directed from the upper hierarchy layer to the lower hierarchy layer.

16. The data processing system as claimed in claim 15, wherein when the primary data is updated, the process analysis unit specifies secondary data to be created according to the updated primary data.

17. The data processing system as claimed in claim 15, wherein when the primary data is updated, the process analysis unit specifies a program for creating secondary data according to the updated primary data or secondary data created from the updated primary data.

18. The data processing system as claimed in claim 15, wherein when the primary data is updated, the process analysis unit specifies an update time of secondary data to be created according to the updated primary data.

19. The data processing system as claimed in claim 15, wherein when the primary data is updated, the process analysis unit specifies a program for creating secondary data according to the updated primary data or secondary data created from the updated primary data and executes a program required for updating the secondary data.

20. The secondary data creation system according to claim 15, wherein executing the program for creating the requested secondary data, if the relationship between the secondary data and the data update information of the requested secondary data does not satisfy a predetermined condition.

21. A data processing program for creating requested secondary data by a program in which a data creation procedure is pre-defined according to primary data, the program causing a computer to execute steps of:

reading the primary data;

storing the primary data update information including an update time of the primary data;

creating secondary data according to the pre-defined program;

storing the secondary data update information including an update time of the secondary data;

receiving a generation request of the secondary data;

upon reception of the generation request of the secondary data, reading the primary data update information on the primary data required for creating the requested secondary data and the secondary data update information on the secondary data and judging the relationship with the data update information on the requested secondary data;

if the judgment result does not satisfy a predetermined condition, executing the pre-defined program for creating the requested secondary data, and the processor outputting the primary data and the secondary data to the output unit while correlating the primary data to the secondary data, wherein the primary data and the secondary data which are outputted have a hierarchical structure formed by the secondary data as an upper hierarchy layer, and either one of the primary data or the secondary data as a lower hierarchy layer viewed from the program creating the secondary data, and wherein the hierarchical structure is expressed by a directed graph formed by nodes corresponding to the primary data, the secondary data, and the program, and a directed branch connecting the nodes and directed from the upper hierarchy layer to the lower hierarchy layer.

* * * * *